(12) United States Patent
Yamada et al.

(10) Patent No.: US 8,507,138 B2
(45) Date of Patent: Aug. 13, 2013

(54) EJECTOR FOR FUEL CELL SYSTEM

(75) Inventors: Kouichi Yamada, Takanezawa-machi (JP); Kazunori Fukuma, Saitama (JP); Makoto Wada, Saitama (JP)

(73) Assignee: Keihin Corporation, Tokyo (JP)

( * ) Notice: Subject to any disclaimer, the term of this patent is extended or adjusted under 35 U.S.C. 154(b) by 968 days.

(21) Appl. No.: 12/456,243

(22) Filed: Jun. 12, 2009

(65) Prior Publication Data

US 2009/0317691 A1 Dec. 24, 2009

(30) Foreign Application Priority Data

| Jun. 13, 2008 | (JP) | 2008-155187 |
| Jun. 13, 2008 | (JP) | 2008-155189 |
| Jun. 16, 2008 | (JP) | 2008-157085 |
| Jun. 16, 2008 | (JP) | 2008-157089 |

(51) Int. Cl.
*H01M 8/04* (2006.01)
*F04F 5/48* (2006.01)

(52) U.S. Cl.
USPC ............................ 429/415; 137/114; 417/187

(58) Field of Classification Search
USPC .......... 417/182, 187; 137/111, 114; 429/415
See application file for complete search history.

(56) References Cited

U.S. PATENT DOCUMENTS

| 3,551,075 A * | 12/1970 | Wilson ........................... 417/182 |
| 6,706,438 B2 * | 3/2004 | Sahoda et al. ............ 137/111 X |
| 7,105,243 B2 * | 9/2006 | Morishima et al. ........... 429/415 |
| 2002/0106547 A1 | 8/2002 | Sugawara et al. |
| 2007/0163649 A1 * | 7/2007 | Yamagishi et al. ........... 137/114 |

FOREIGN PATENT DOCUMENTS

| JP | 57-117474 U | 7/1982 |
| JP | 3-12067 U | 2/1991 |
| JP | 09-320840 A | 12/1997 |
| JP | 10-012435 A | 1/1998 |
| JP | 2001-263522 A | 9/2001 |
| JP | 2002-013662 A | 1/2002 |
| JP | 2002-227799 A | 8/2002 |
| JP | 2004-178843 | 6/2004 |
| JP | 2005-233121 A | 9/2005 |
| JP | 2005-273704 A | 10/2005 |
| JP | 2006-153207 A | 6/2006 |
| JP | 2006-233807 A | 9/2006 |
| JP | 2006-250000 A | 9/2006 |
| JP | 2007-120441 A | 5/2007 |
| JP | 2008-196458 A | 8/2008 |

OTHER PUBLICATIONS

Computer-generated English translation of JP 2006-233807, from the Japanese Patent Office website (doc date Jul. 9, 2006).*

* cited by examiner

*Primary Examiner* — Stephen J. Kalafut
(74) *Attorney, Agent, or Firm* — Carrier Blackman & Associates, P.C.; Joseph P. Carrier; Jeffrey T. Gedeon

(57) ABSTRACT

An ejector for a fuel cell system of the present invention includes a nozzle having a nozzle hole for discharging hydrogen supplied via an inlet port of an ejector body, a diffuser for mixing hydrogen discharged from the nozzle hole and hydrogen off-gas discharged and returned via a circulation passage from a fuel cell, a needle displacing in the axial direction by a driving force of a solenoid, and a bearing member held in a hollow portion of the nozzle, and having a through hole that movably supports the needle in the axial direction.

12 Claims, 17 Drawing Sheets

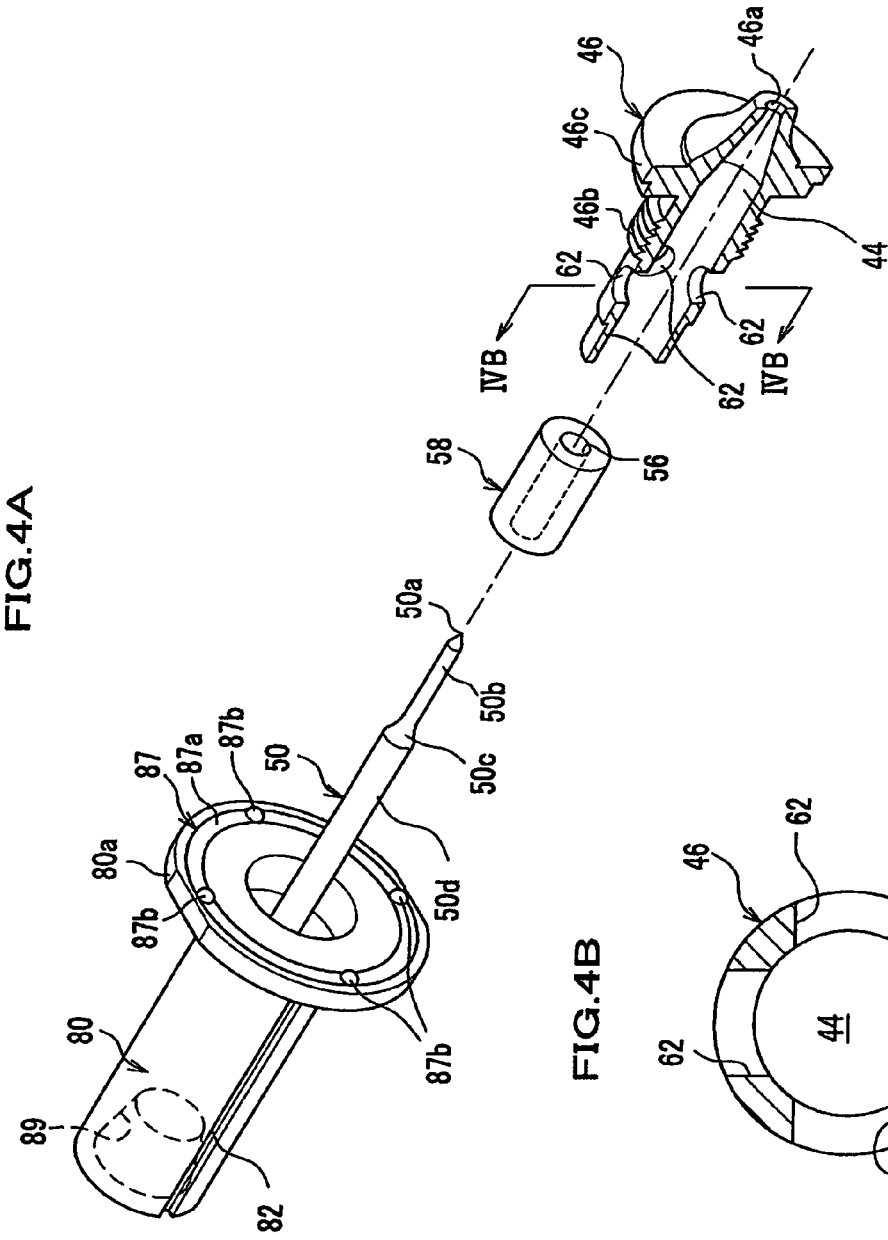
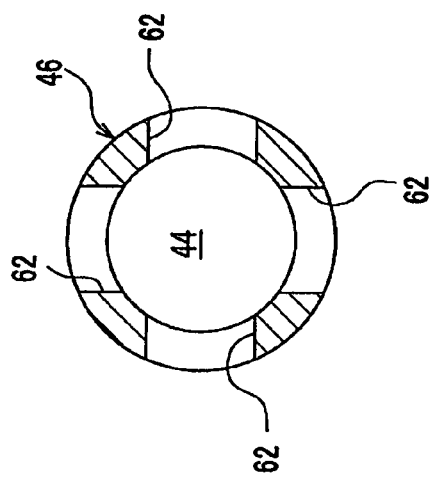

EJECTOR FOR FUEL CELL SYSTEM

CROSS-REFERENCE TO RELATED APPLICATION

This application claims the foreign priority benefit under 35 U.S.C. §119 of Japanese Patent Application No. 2008-155187 filed on Jun. 13, 2008, Japanese Patent Application No. 2008-155189 filed on Jun. 13, 2008; Japanese Patent Application No. 2008-157085 filed on Jun. 16, 2008; and Japanese Patent Application No. 2008-157089 filed on Jun. 16, 2008 the disclosures of which are incorporated herein by reference.

BACKGROUND OF THE INVENTION

1. Field of the Invention

The present invention relates to an ejector used for a fuel cell system including a fuel cell.

2. Description of the Related Art

Recently, there have been many developments regarding a fuel cell vehicle having a fuel cell such as a polymer electrolyte fuel cell (PEFC). In such a fuel cell vehicle, a motor is rotated by power generated by the fuel cell so as to drive the vehicle.

In general, the fuel cell includes stacks of a plurality of single cells. Each single cell includes MEA (membrane electrode assembly). When fuel gas (hydrogen) is supplied for an anode of the MEA, and oxidant gas (air including oxygen) is supplied for a cathode thereof, difference in potential is caused on each single cell, which is electrically connected to an outer load such as a motor, and then the fuel cell starts generating power.

There has been proposed a fuel cell system including a fuel cell, in which fuel off-gas (hydrogen off-gas) discharged from the fuel cell is mixed with a new fuel gas (hydrogen) to be supplied for the fuel cell, so as to be re-circulated, thereby to utilize the fuel gas as well as to enhance energy efficiency of the PEFC. In such a case of a prior art, there has been known a fuel cell system that re-circulates fuel off-gas using an ejector.

By the way, it has been pointed out that because, in such a fuel cell system using an ejector, each diameter of a nozzle and a diffuser that are included in the ejector is fixed, it is difficult to supply fuel gas for the fuel cell in accordance with various driving situations (e.g. various driving situations through an idling driving to a high speed driving) of a fuel cell vehicle including the fuel cell system.

In the light of this problem, JP2004-178843A discloses a fluid supply apparatus for a fuel cell whose first to third ejectors have each nozzle with a different diameter, and whose first and second switch valves switch a fuel supply passage of fuel gas for one of the first to third ejectors; and by using combination of on-off operations of the first and the second switch valves, fuel gas is supplied for a desired one selected from the first to third ejectors.

However, such a fluid supply apparatus for a fuel cell disclosed in JP2004-178843A has the three ejectors having each nozzle with a different diameter and the two switch valves of electromagnetic valves that switch the fuel gas supple passage for the ejectors within a unit body of the apparatus; therefore, the size of the overall apparatus inevitably becomes larger, so that there has been desired to reduce a size and weight of an overall fluid supply apparatus.

It has also been desired to stabilize discharge rate of fuel gas discharged from a nozzle of an ejector, and to supply fuel gas at a stable flow rate for a fuel cell.

In addition, in the above fluid supply apparatus for a fuel cell, the first and second switch valves are electromagnetic valves having each solenoid, so that when a movable core attracted to a fixed core due to excitation of the solenoids, or when the movable core returns to its original position when the solenoid becomes unexcited, the movable core collides against the fixed core of magnetic material or other metal members and may generate collision noises and vibrations. Hence, there has been desired to prevent such collision noises and vibrations of the solenoid from propagating to a vehicle interior, so as to ensure quietness in the vehicle interior.

Yet, in the above fluid supply apparatus for a fuel cell, the first and the second switch valves are electromagnetic valves of solenoids each including a movable core and a fixed core, and the valves are vertically-installed type in which each movable core slides in the vertical direction thereby to displace its valve body. If an electromagnetic valve with a horizontally-installed solenoid is employed in order to reduce a vertical size of the overall ejector apparatus, when a movable core is attracted to a fixed core in the horizontal direction due to excitation of the solenoids, or when the movable core returns in the horizontal direction to its original position when the solenoid becomes unexcited, the axis of the movable core becomes deviated in the vertical direction due to its own weight in a clearance around the sliding part thereof so that friction against other members becomes greater, which may cause a problem of deterioration of the movable core duration.

SUMMARY OF THE INVENTION

The general object of the present invention is to provide an ejector for a fuel cell system that secures a stable discharge rate of fuel gas from a nozzle within a variable flow rate range, and the primary purpose of the present invention is to provide an ejector for a fuel cell system (hereinafter also referred to as only an "ejector") that realizes reduction in size and weight.

Another object of the present invention is to provide an ejector for a fuel cell system that reduces collision noises and vibrations occurred in a solenoid, so as to secure quietness in a fuel cell vehicle interior.

Yet, another object of the present invention is to provide an ejector for a fuel cell system that reduces abrasion of a movable core in a horizontally-installed type solenoid, so as to enhance durability of the movable core.

In one aspect of the present invention, there is provided an ejector for a fuel cell system including an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell; a nozzle having a nozzle hole for discharging fuel gas supplied via the inlet port; a diffuser for mixing the fuel gas discharged from the nozzle hole and a fuel off-gas discharged and returned via the circulation passage from the fuel cell; a nozzle-hole section area regulating mechanism including a needle axially extending in a hollow portion of the nozzle, the nozzle moving forward and backward in the nozzle hole so as to regulate a discharge section area of the nozzle hole; and a bearing member held in the hollow portion of the nozzle and having a through hole through which the needle is movably supported in the axial direction.

In another aspect of the present invention, there is provided an ejector for a fuel cell system including an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell; a nozzle having a nozzle hole for discharging fuel gas supplied via the inlet port; a diffuser for mixing the fuel gas discharged from the nozzle hole and a fuel off-gas discharged and returned via the circulation passage from the fuel cell; a nozzle-hole section area regulating mechanism including a needle axially extending in a hollow portion of the nozzle and for regulating a discharge section area of the nozzle hole; a solenoid includes a movable core that displaces along with the needle toward a fixed core due to a coil excitation; and a stopper of elastic material provided on the movable core, the stopper abutting other members so as to restrict the displacement of the movable core.

Yet, in another aspect of the present invention, there is provided an ejector for a fuel cell system including an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell; a nozzle having a nozzle hole for discharging fuel gas supplied via the inlet port; a diffuser for mixing the fuel gas discharged from the nozzle hole and a fuel off-gas discharged and returned via the circulation passage from the fuel cell; a nozzle-hole section area regulating mechanism including a needle axially extending in a hollow portion of the nozzle and for regulating a discharge section area of the nozzle hole; and a solenoid includes a movable core that displaces along with the needle toward a fixed core due to a coil excitation, wherein a dent portion is provided at one end portion of the movable core opposing the fixed core in the axial direction, the dent portion extending apart from the fixed fore, and a projection portion is provided at one end portion of the fixed core opposing the dent portion of the movable core in the axial direction, the projection portion having a shape corresponding to the shape of the dent portion.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

BRIEF DESCRIPTION OF THE DRAWINGS

FIG. 4A is a partially exploded perspective view of the nozzle portion included in the ejector.

FIG. 4B is a cross section view along a line IVB-IVB of FIG. 4A.

DETAILED DESCRIPTION OF THE INVENTION

Detailed descriptions will be provided on an embodiment of the present invention, with reference to the attached drawings.

Figure 1:
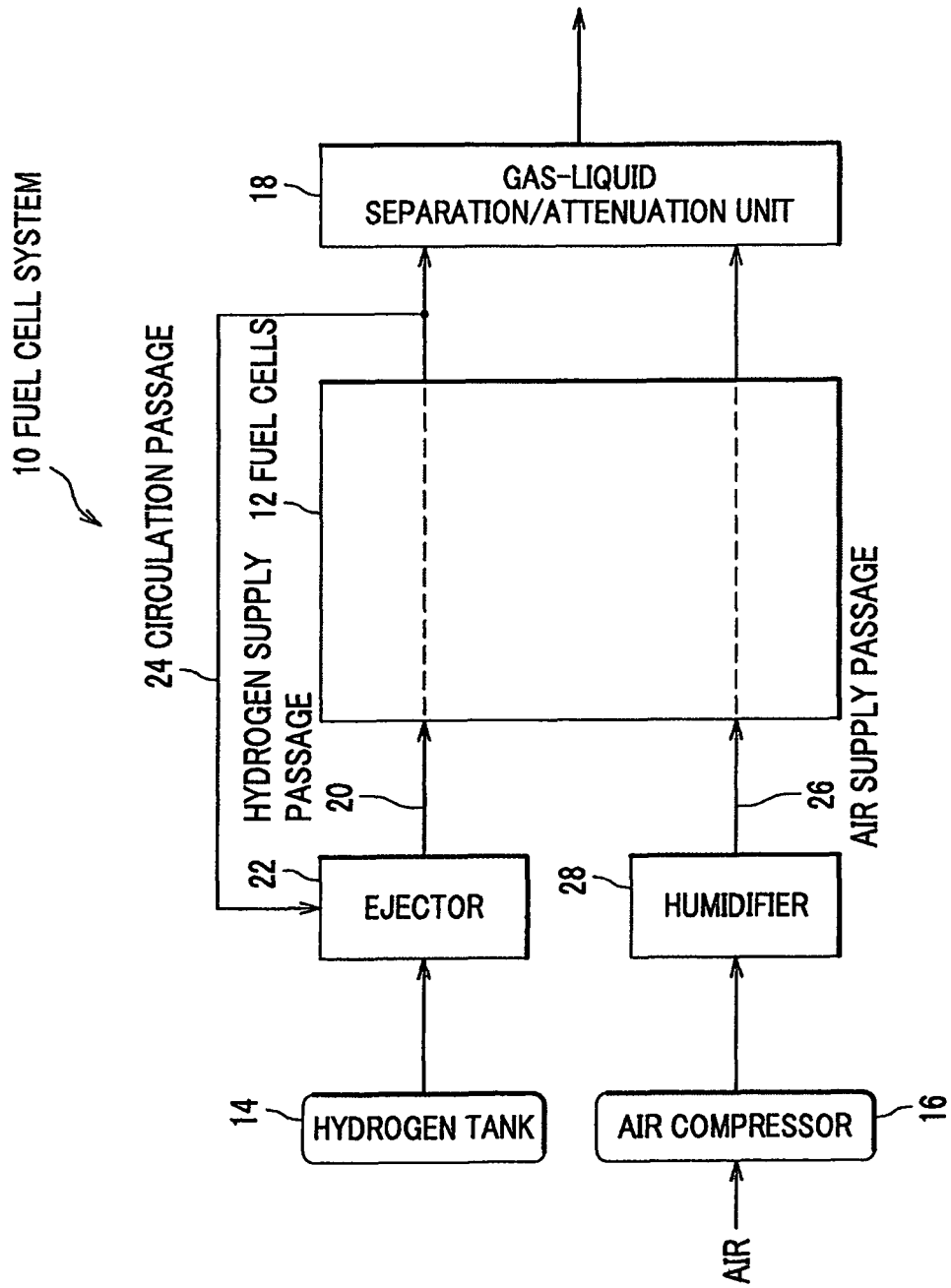
FIG. 1 is a block diagram of a fuel cell system including an ejector according to an embodiment of the present invention.

As shown in FIG. 1, the fuel cell system 10 includes a fuel cell 12, a hydrogen tank (also referred to as a "fuel gas supply means") 14 that is charged with high pressured hydrogen gas and supplies the hydrogen gas as fuel gas for the fuel cell 12, an air compressor 16 that supplies compressed air including oxidant gas (oxygen) for the fuel cell 12, a gas-liquid separation/attenuation unit 18 that separates un-reacted hydrogen into gas (hydrogen) and liquid (water) and also attenuates the separated hydrogen with un-reacted air discharged from the fuel cell 12.

The fuel cell 12 may be a polymer electrolyte fuel cell (PEFC), for example, and is installed in a vehicle such as a fuel cell vehicle. The fuel cell 12 have a stack body including a plurality of stacked single cells (not shown), and also has an anode that is supplied with hydrogen as fuel gas and a cathode that is supplied with air including oxygen as an oxidant gas.

A hydrogen supply passage (also referred to as a "fuel gas supply passage") 20 is provided between the hydrogen tank 14 and the fuel cell 12, and there is provided in the hydrogen supply passage 20 an ejector 22 serving as an ejector for a fuel cell system. The ejector 22 is communicated with a circulation passage 24 for feeding back un-reacted hydrogen (hereinafter also referred to as "hydrogen off-gas") which is a fuel off-gas discharged from the fuel cell 12, so as to mix hydrogen supplied from the hydrogen tank 14 and hydrogen off-gas fed back from the fuel cell 12 and re-supply (re-circulate) this mixed gas for the fuel cell 12.

There is provided between the hydrogen tank 14 and the ejector 22 a hydrogen pressure regulator (not shown) including a regulator that regulates pressure of hydrogen to be supplied for the fuel cell 12 at a predetermined pressure, in response to air input from the air compressor 16 as a pilot pressure signal.

There is provided an air supply passage 26 between the air compressor 16 and the fuel cell 12, and there is also provided in the air supply passage 26 a humidifier 28 that humidifies dry air supplied from the air compressor 16. Air humidified by the humidifier 28 is led via the air supply passage 26 toward the cathode of the fuel cell 12.

In the gas-liquid separation/attenuation unit 18, there are installed, for example, a not-shown hydrogen purge valve that purges the not shown attenuation unit side by flowing water pooled in the anode of the fuel cell 12 and fuel gas including nitrogen gas immixed from the cathode through the electrolyte membrane into the anode; a not shown catch tank that separate hydrogen gas including water discharged from the fuel cell 12 into hydrogen and water; and not-shown a drain valve that opens or closes a pipe passage for discharging drain pooled in the catch tank, etc.

Next, descriptions will be provided on the ejector 22.

Figure 2:
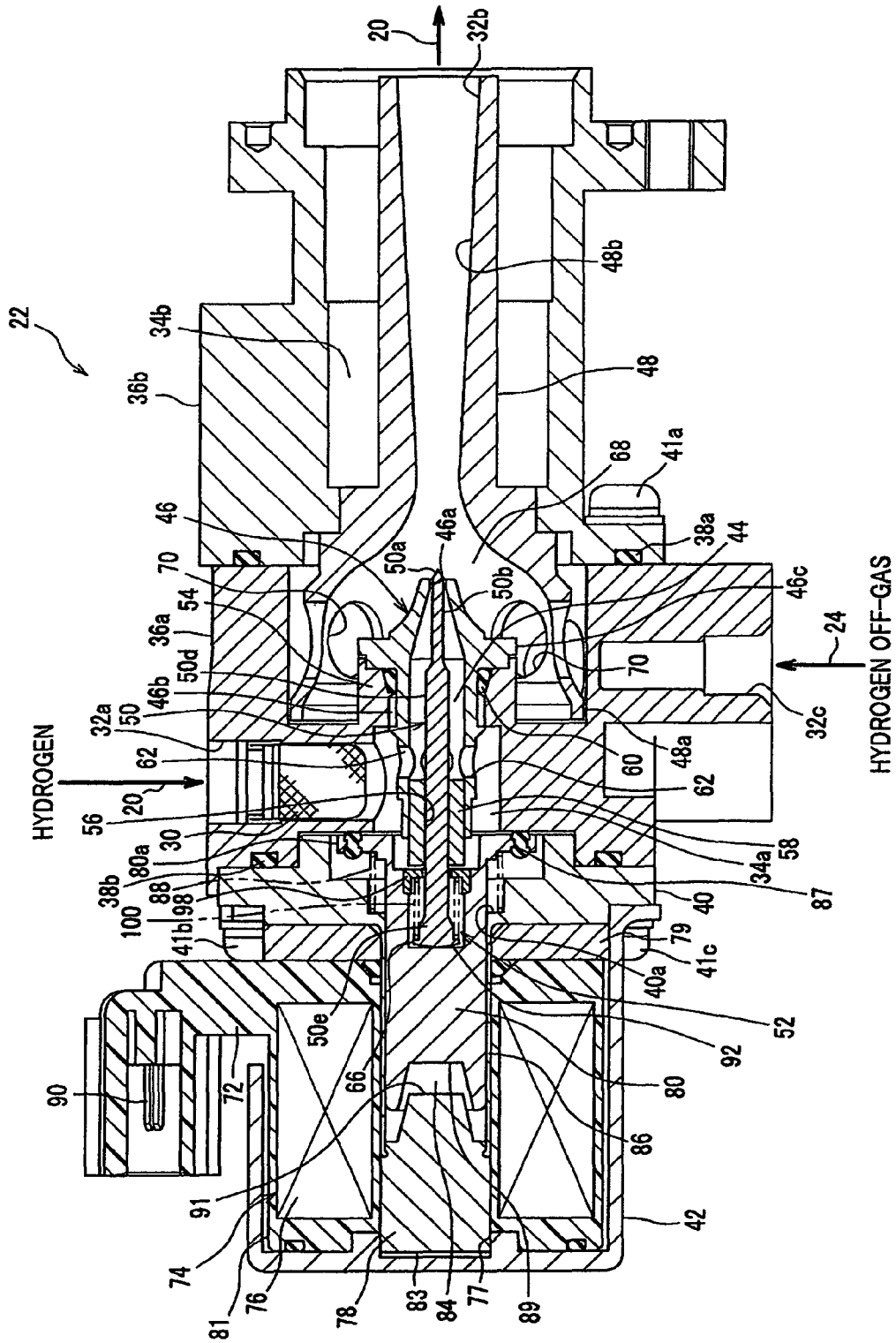
FIG. 2 is a longitudinal section view along the axial direction of the ejector of FIG. 1.
Figure 3:
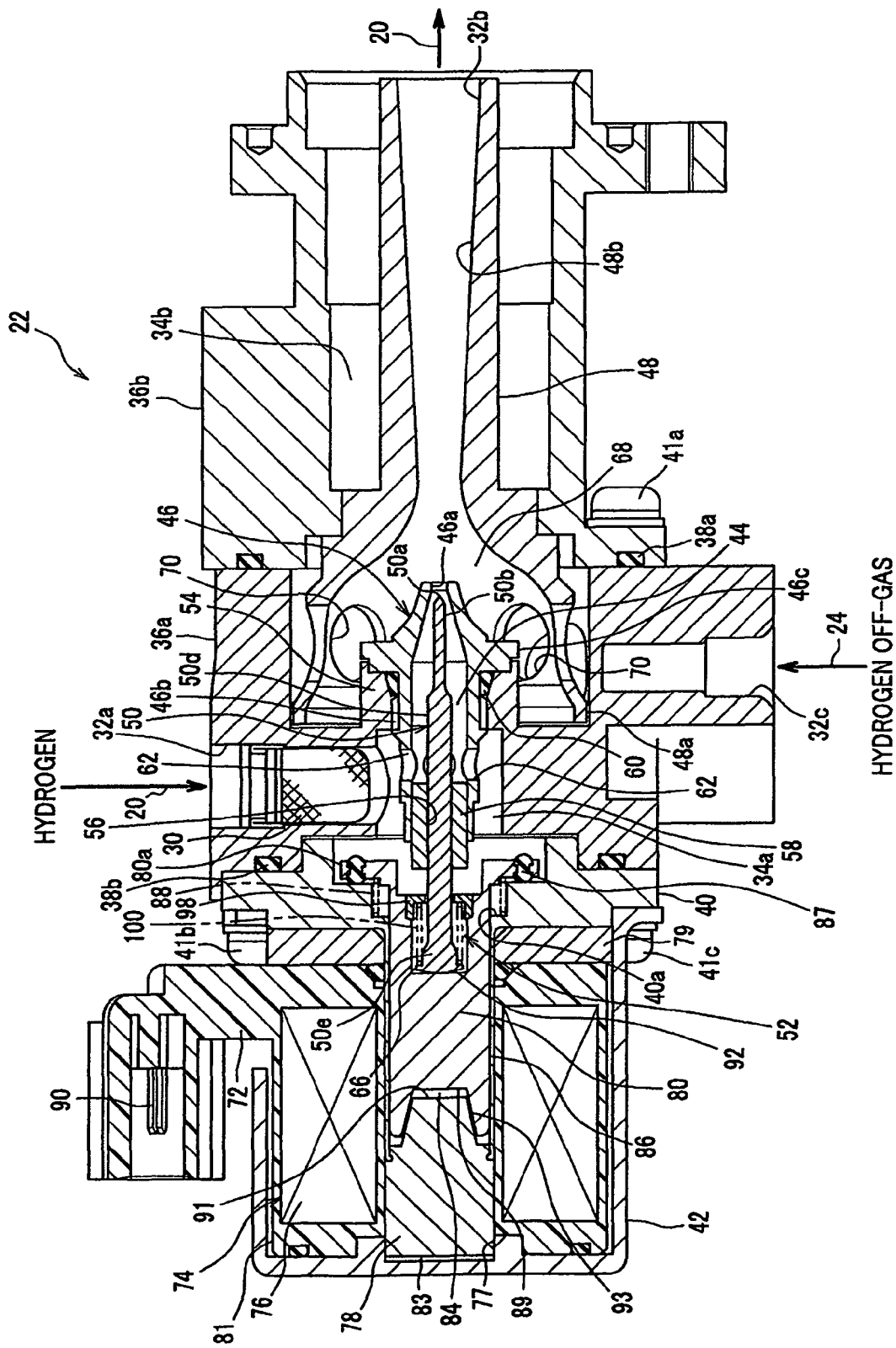
FIG. 3 is a longitudinal section view showing a state in which a longitudinal section area of a nozzle hole in the ejector of FIG. 2.

The ejector 22 has an ejector body including, as shown in FIGS. 2 and 3, an inlet port 32a communicated via the filter 30 with the hydrogen supply passage 20 and supplied with relatively high-pressured hydrogen from the hydrogen tank 14; an outlet port 32b communicated with the hydrogen supply passage 20 communicated with the fuel cell 21, and from which mixed gas of hydrogen off-gas and hydrogen supplied from the hydrogen tank 14 is discharged; and a suction port 32c communicated with the circulation passage 24, and into which hydrogen off-gas is suctioned via the circulation passage 24.

The ejector body includes a first block 36a having a first space 34a extending in the horizontal direction and communicated with the inlet port 32a and the suction port 32c; a second block 36b connected via a first seal member 38a to one side face of the first block 36a, and having a second space 34b extending in the horizontal direction through the first space 34a and the outlet port 32b; a cover plate 40 connected via a second seal member 38a to the other side face of the first block 36a, opposing the second block 36b; and a housing 42 integrally screwed up to the cover plate 40.

Figure 6:
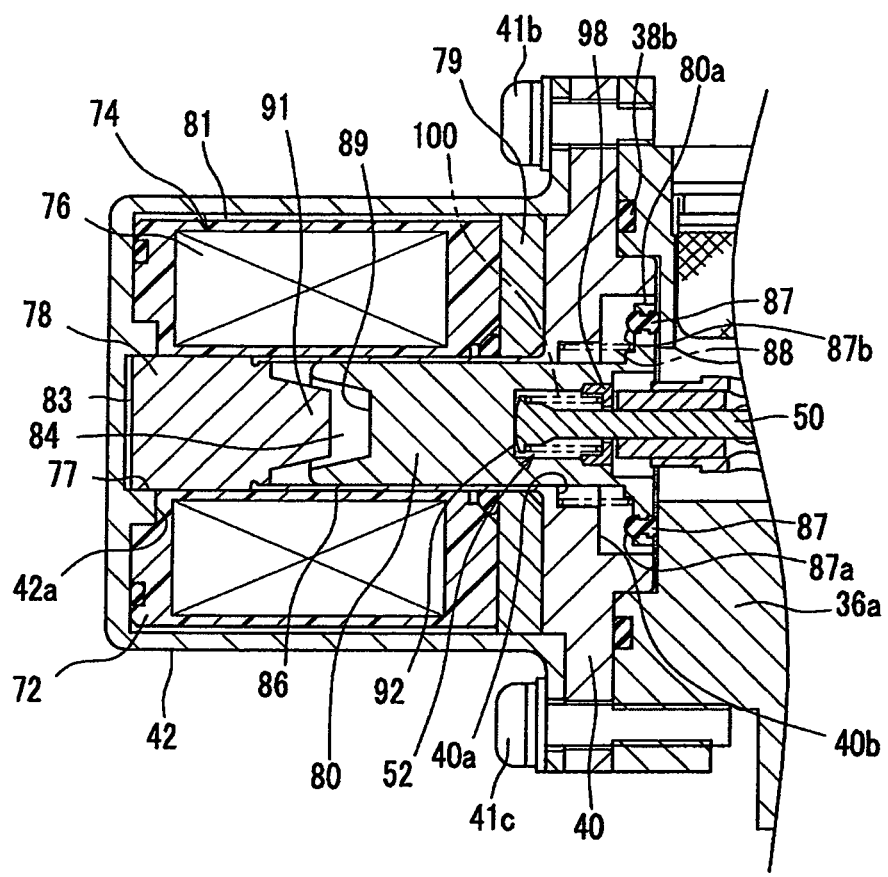
FIG. 6 is a partial longitudinal section view showing a state of holding a housing, a cover plate and a first block included in the ejector.

The first block 36a and the second block 36b are integrally screwed up to each other through a screw member 41a, and the first block 36a, the cover plate 40 and the housing 42 are integrally screwed up to one another via screw members 41a and 41c (see FIG. 6).

The first and second seal members 38a, 38b keep the first and second spaces 34a, 34b to be sealed air-tightly and liquid-tightly.

The ejector body therewithin includes a nozzle section having an approximately cylindrical nozzle 46 in which a hollow portion 44 is formed in the horizontal direction; a diffuser section having a diffuser 48 coaxial to the nozzle 46; a needle holding mechanism 52 that holds a needle 50 (described later) such that the needle 50 tiltably moves at a predetermined angle; and an electromagnetic actuator section that moves the needle 50 backward or forward along the axial direction of the nozzle 46.

The nozzle section includes the nozzle 46 having a nozzle hole 46a at one end portion thereof, extending in the axial direction, and the diameter of the nozzle hole 46a gradually becomes smaller toward the diffuser 48 side, as shown in FIG. 4A. The nozzle 46 is held to the first block 36a by a (sward) guard-like nozzle holding portion 54 projecting toward the diffuser 48 (see FIG. 2), as well as a female screw portion provided on the inner wall of the nozzle holding portion 54 that is screwed up with a male screw 46b provided on the outer circumferential face of the nozzle 46.

As shown in FIGS. 2 and 3, the nozzle section includes the needle 50 that is installed in the hollow portion 44 of the nozzle 46 such that the needle 50 moves through the nozzle hole 46a; a bearing member 58 in an approximately cylindrical shape, installed in the hollow portion 44 at the other end portion of the nozzle 46, axially supporting the needle 50 in such a manner that the needle 50 slides through its through hole 56; and a sealing 60 provided between an annular flange 46c projecting in the radial direction of the nozzle 46 and the male screw 46b provided on the outer circumferential face of the nozzle 46.

As shown in FIG. 4B, plural hydrogen introduction holes (also referred to as "fuel gas introduction holes") 62 are provided at the approximately middle portion of the nozzle 46 with a radial interval at 90 degrees therebetween (for example, there are four hydrogen introduction holes 62 in the present embodiment), and hydrogen supplied from the inlet port 32a through the hydrogen introduction holes 62 is introduced into the hollow portion 44 of the nozzle 46.

As shown in FIGS. 2 and 3, the needle 50 includes a smaller diameter portion 50b having a tip end 50a of a sharply pointed apex that faces the nozzle hole 46a; a tapered portion 50c (see FIG. 4A) continued from the smaller diameter portion 50b from which its diameter gradually becomes enlarged; an intermediate diameter portion 50d continued from the tapered portion 50c, having a diameter greater than that of the smaller diameter portion 50b, and having an approximately constant outer diameter in the axial direction; and a greater diameter portion 50e continued from the intermediate diameter portion 50d, having a diameter greater than that of the intermediate diameter portion 50d, and having a partially spherical face 92 at one end face thereof.

In the present embodiment, the plural hydrogen introduction holes 62 are provided on the outer circumferential face of the nozzle 46 with an interval of a 90 degree angle therebetween in the circumferential direction (see FIG. 4B), but the present invention is not limited to this as far as plural holes are provided. In addition, the plane shape of each hydrogen introduction hole 62 is not limited to a circular shape, and it may be a rectangular or oval shape.

The outer circumferential face of the greater diameter portion 50e, as shown in FIGS. 2 and 3, is provided with a spring bearing portion 66 made of an annular flange slightly projecting outward in the radial direction, to which a spring member 100, described later, is locked.

The bearing member 58, as shown in FIG. 4A, has a cylindrical body with the through hole 56 having a predetermined inner diameter along the axial direction. In this case, in order to hold the needle 50 (the smaller diameter 50b, the tip end 50a) out of contact with the inner diameter portion of the nozzle hole 46a of the nozzle 46, the inner diameter of the through hole 56 of the bearing member 58 may be defined by satisfying the following formula (1):

$$(D1-D2)(L1+L2)/L1 < (D4-D3)/2 \quad \text{Formula (1)}$$

where,
- D1: the inner diameter of the through hole 56 of the bearing member 58
- D2: the outer diameter of the intermediate portion 50d of the needle 50
- D3: the outer diameter of the smaller diameter portion 50b of the needle 50
- D4: the inner diameter of the nozzle hole 46a of the nozzle 46
- L1: the axial length of the bearing member 58
- L2: the axial distance between the bearing member 58 and the nozzle hole 46a (see FIGS. 5A to 5D).

Figure 5A:
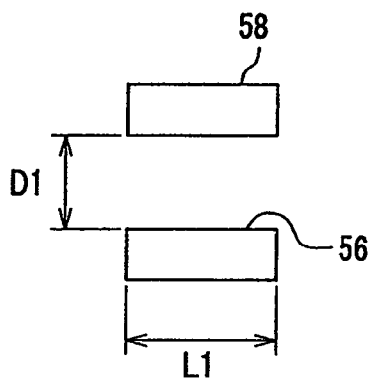
FIG. 5A is a schematic view indicating parameters related to a relational expression among a bearing member, the needle and the nozzle hole.
Figure 5B:
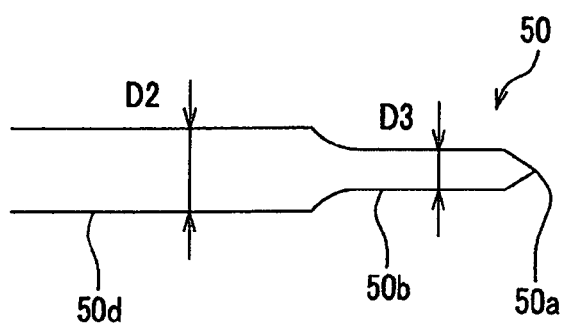
FIG. 5B is a schematic view indicating parameters related to a relational expression among the bearing member, the needle and the nozzle hole.
Figure 5C:
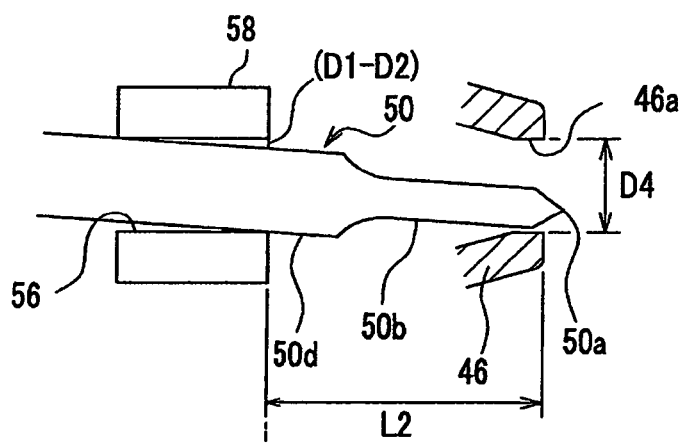
FIG. 5C is a schematic view indicating parameters related to a relational expression among the bearing member, the needle and the nozzle hole.
Figure 5D:
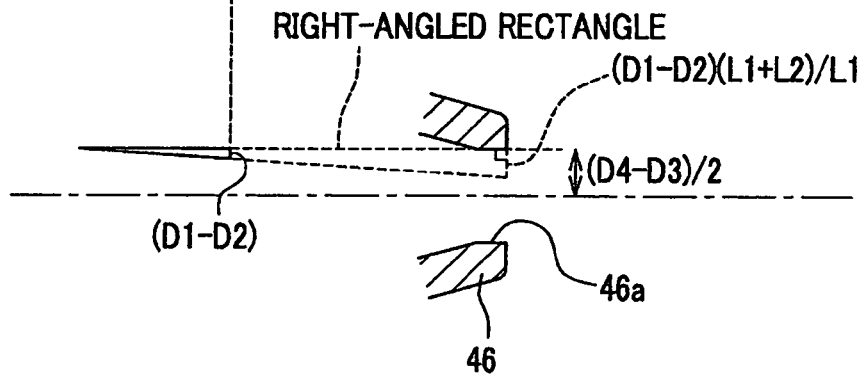
FIG. 5D is a schematic view indicating parameters related to a relational expression among the bearing member, the needle and the nozzle hole.

The length of $(D1-D2)(L1+L2)/L1$ that constitutes one side of the right-angled triangle represented by the broken line in FIG. 5D is set to be smaller than $(D4-D3)/2$, a length half of the difference between the inner diameter D4 of the nozzle hole 46a and the outer diameter D3 of the smaller portion 50b of the needle 50, thereby to preferably prevent the needle 50 (the smaller diameter 50b, the tip end 50a) from coming in contact with the inner diameter portion of the nozzle hole 46a of the nozzle 46.

The outer diameter D2 of the intermediate portion 50d of the needle 50 functions as an outer diameter of the needle 50 axially supported by the bearing member 58, and the outer diameter D3 of the smaller diameter portion 50b of the needle 50 functions as an outer diameter of the needle 50 inserted in the nozzle hole 46a.

The bearing member 58 is installed in the hollow portion 44 at the other end of the nozzle 46 so as to support the approximately middle portion of the intermediate portion 50d of the needle 50, and a part of the outer circumferential face of the bearing member 58 is set to be exposed from the end face of the nozzle 46 (see FIGS. 2 and 3). Specifically, even if the center of gravity (not shown) of the needle 50 that slidingly displaces does not stay within a position between the one end and the other end of the bearing member 58 in the axial direction, the needle 50 is axially supported by the bearing member 58 in a stable manner. The diffuser 48 includes an enlarged diameter portion 48a in a trumpet shape surrounding a part of the nozzle 46 having the nozzle 46a, and a throat portion 48b which is a cylinder hollow body continued from the enlarged diameter portion 48a, and having thereinside a straight passage with a diameter gradually enlarged toward the outlet port 32b.

In this case, the nozzle 46, the needle 50 and the diffuser 48 are coaxially arranged (all three has the same axis line). Between the nozzle 46 and the diffuser 48, there is provided a suction chamber 68 such that the chamber 68 communicates with a suction port 32c via plural suction holes 70 on the diffuser 48, each of which is formed in a circular shape.

The electromagnetic actuator section includes the solenoid 74 housed in the housing 42 with a resin seal 72. This solenoid 74 includes a coil assembly including a coil 76 wounded around a coil bobbin of resin material (not shown), a fixed core 78 held by a recessed portion 77 formed in an inner wall of the housing 42, and the movable core 80 that moves closely to or apart from the fixed core 78.

Between the resin seal 72 in which the coil 76 is molded and the cover plate 40, there is provided an intermediate plate 79. There is provided an appropriate clearance 81 between an outer diameter face of the resin seal 72 and an inner diameter face of the housing 42. Between a bottom wall of the recessed portion 77 of the housing 42 and the end face of the fixed core 78 opposing the bottom wall, there is provided another appropriate clearance 83. The solenoid 74 is set to be of a horizontally-installed type so that the movable core 80 displaces in the horizontal direction.

Figure 7:
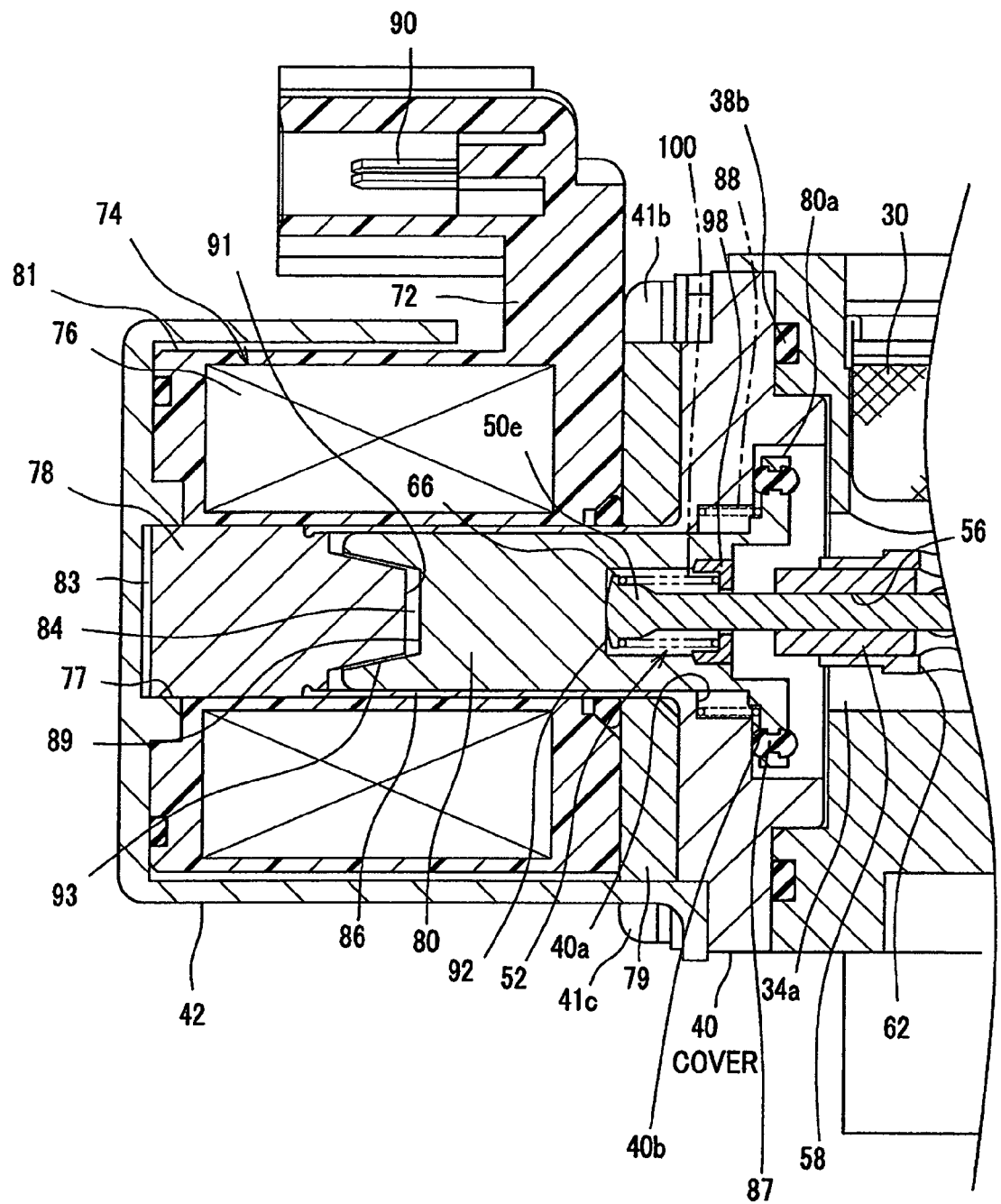
FIG. 7 is a partially enlarged longitudinal section view showing a state in which a stopper comes in contact with one end of the cover plate when the movable core displaces toward a fixed core from the state of FIG. 6.

The housing 42 has a cylinder hollow body with a bottom, and there is provided on the inner wall face of the bottom of the cylinder hollow body an annular projection 42a that projects toward the movable core 80 with a predetermined length, in which the fixed core 78 is installed (see FIGS. 6 and 7). The annular projection 42a, as described later, functions as a flux relay portion that relays magnetic force flux between the inner circumferential face of the annular projection 42a and the fixed core 78 in the radial direction (see FIG. 10B).

In stead of using the annular projection 42a, an annular recessed portion may be formed, and one end of the fixed core 78 is installed in the inner circumferential face of the annular recessed portion. In this case, the flux relay portion is formed, which relays magnetic force flux in the radial direction between the inner circumferential face of the annular recessed portion and the fixed core 78.

A long groove 82 extending in the axial direction is formed on the outer circumferential face of the movable core 80 (see FIG. 4A), and a chamber 84 formed between the movable core 80 and the fixed core 78 becomes in communication with the first space 34a through the long groove 82, thereby to smoothly supply or discharge gas in the chamber 84 when the movable core 80 displaces.

Figure 8B:
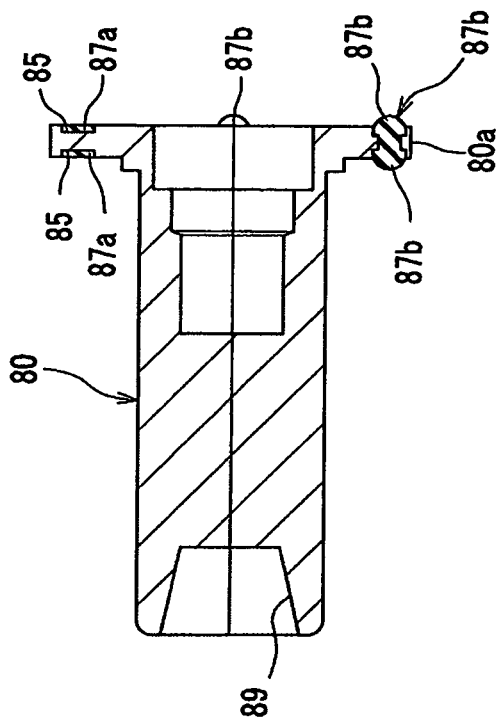
FIG. 8B is a cross section view along a line VIIIB-VIIIB of FIG. 8A.
Figure 8A:
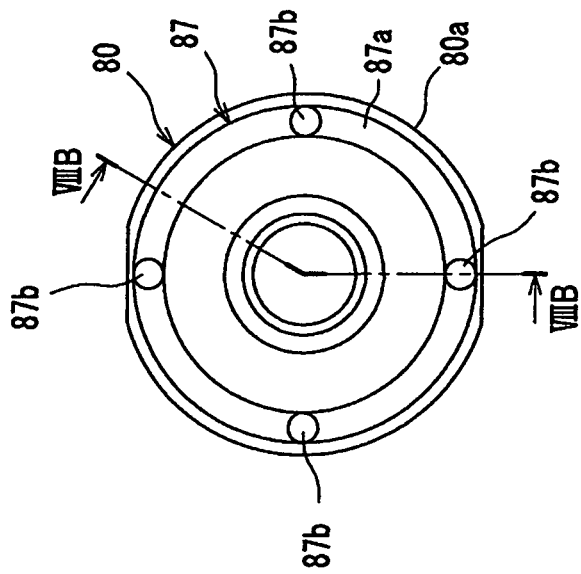
FIG. 8A is a front elevation view of the movable core with a stopper viewed from an annular flange side.

As shown in FIG. 4A, there is provided on one end of the movable core 80 along the axial direction an annular flange 80a projecting with a predetermined length toward the radial direction. As shown in FIGS. 8A and 8B, the annular flange 80a includes a stopper 87 constituted by a web-like annular body 87a attached in an annular groove (also referred to as a "groove portion") 85 and plural semispherical projections 87b projecting with a predetermined length parallel to the axial line of the movable core 80 and disposed on a circumferential flat face of the annular body 87a with an interval of 90 degree therebetween, both of which are integrally formed. The shape of the projections 87b is not limited to be semi-spherical (approximately semispherical shape in the longitudinal section), and may include a polygonal shape, a semi-elliptical shape, or combination thereof in the longitudinal section.

The stopper 87 may be an elastic body made of rubber, resin or sponge material, for example, and is formed on front and back faces of the annular flange 80a by using a baking process or the like. The stopper 87 may also be formed by using an elastic body of spring material such as a spring coil or a plate spring, for example.

Figure 9B:
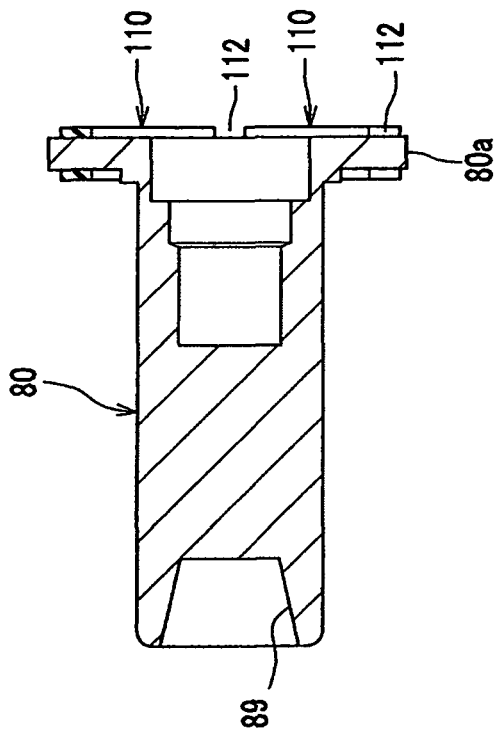
FIG. 9B is a cross section view along a line IXB-IXB of FIG. 9A.
Figure 9A:
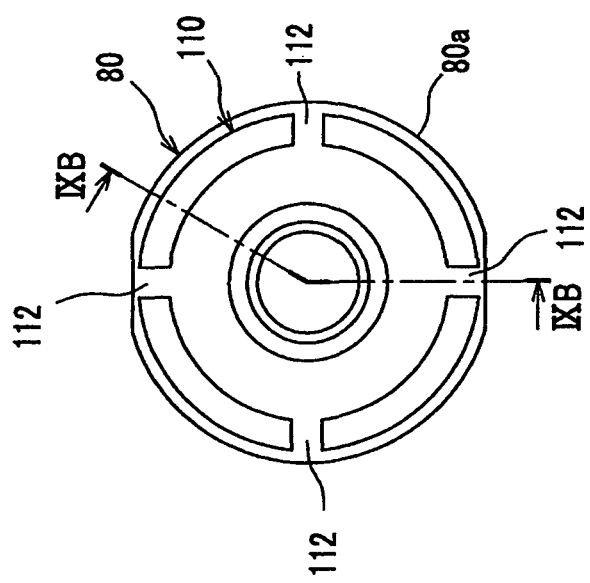
FIG. 9A is a front elevation view of the movable core with a stopper according to a variation.

FIGS. 9A and 9B show a stopper 110 according to a variation of the present embodiment. This stopper 110 according to this variation is different from the stopper 87 as shown in FIGS. 8A and 8B in the following points: the stopper 110 has plural slits 112 on the elastic body extending along the circumferential direction, with an interval of a predetermined angle between each slit 112. The stopper 110 according to this variation has a larger contact area against other members, thereby to reduce pressure applied to its face and enhance its durability.

When the movable core 80 displaces toward the fixed core 78 side due to excitation of the solenoid 74, the semispherical projections 87b of the stopper 87 abuts the second annular step portion 40b of the cover plate 40 functioning as one of other members, providing a buffer effect, thereby to reduce collision noises and vibrations (see FIG. 7). Accordingly, the movable core 80 is prevented from coming in contact with the fixed core 78, hence operation noises and vibrations are preferably prevented from propagating to a fuel cell vehicle interior not shown.

On the other hand, when the solenoid 74 becomes unexcited, and the movable core 80 returns to its original position due to spring force of a return spring 88, the stopper 87 abuts the end face of the first block 36a of metal material functioning as one of other members, providing a buffer effect, thereby to reduce collision noises and vibrations (see FIG. 6). Therefore, the movable core 80 is prevented from coming in contact with the end face of the first block 36a, hence operation noises and vibrations are preferably prevented from propagating to a fuel cell vehicle interior not shown.

In addition, as shown in FIG. 6, on the other end face of the movable core 80 in the axial direction, there are formed a dent portion 89 in a tapered shape in the cross section view, recessed toward a direction apart from the fixed core 78. On the end face of the fixed core 78 opposing this dent portion 89, there is provided a projection portion 91 with a tapered shape in the cross section view, whose shape corresponds to the shape of the dent portion 89, and projecting in a predetermined length toward the movable core 80 side. For the case in which the movable core 80 is attracted to the fixed core due to excitation of the solenoid 74, there is provided a gap 93 between the reversal tapered face of the dent portion 89 of the movable core 80 and the tapered face of the projection portion 91 of the fixed core 78 (see FIG. 7 and FIG. 10A).

As shown in FIG. 7, a cylindrical portion 86 with a thin thickness that extends in the lateral direction toward the fixed core 78 so as to cover an outer circumferential face of the movable core 80 is integrally formed with the cover plate 40. When displacing, the movable core 80 slides in the cylindrical portion 86 that linearly guides the movable core 80. One end of the cylindrical portion 86 in the extending direction is fixed (welded) to an annular step portion of the fixed core 78, thereby to maintain its air-tightness, functioning to prevent hydrogen introduced in the first space 34a from flowing into the coil 76.

The electromagnetic actuator section also includes the return spring 88 whose one end is locked to the annular flange 80a of the movable core 80 and whose other end is locked to the first annular step portion 40a. The return spring 88 functions to push the movable core 80 toward the nozzle 46 with its spring force so that the movable core 80 moves apart from the fixed core 78 and returns to its original position. The coil 76 is electrically connected to a not shown power source via the terminal 90 supported by the resin seal 72.

In this case, the needle 50 and the electromagnetic actuator section for displacing the needle 50 function as a nozzle-hole section area regulating mechanism, and excitation is caused when the not shown power source is powered and the current is let to flow to the coil 76, and the movable core 80 and the needle 50 displace together toward the fixed core 78 due to this excitation, thereby to change the longitudinal section area of the nozzle hole 46a from which hydrogen is injected toward the diffuser 48. Detailed descriptions will be provided on the longitudinal section area of the nozzle hole 46a.

On the one end of the movable core 80 close to the bearing member 58, there is provided the needle holding mechanism 52 that holds the needle 50 such that the needle 50 tiltably moves at a base point S (see FIGS. 11 and 12), which is a contact point of the spherical face 92 to the movable core 80.

Figure 11:
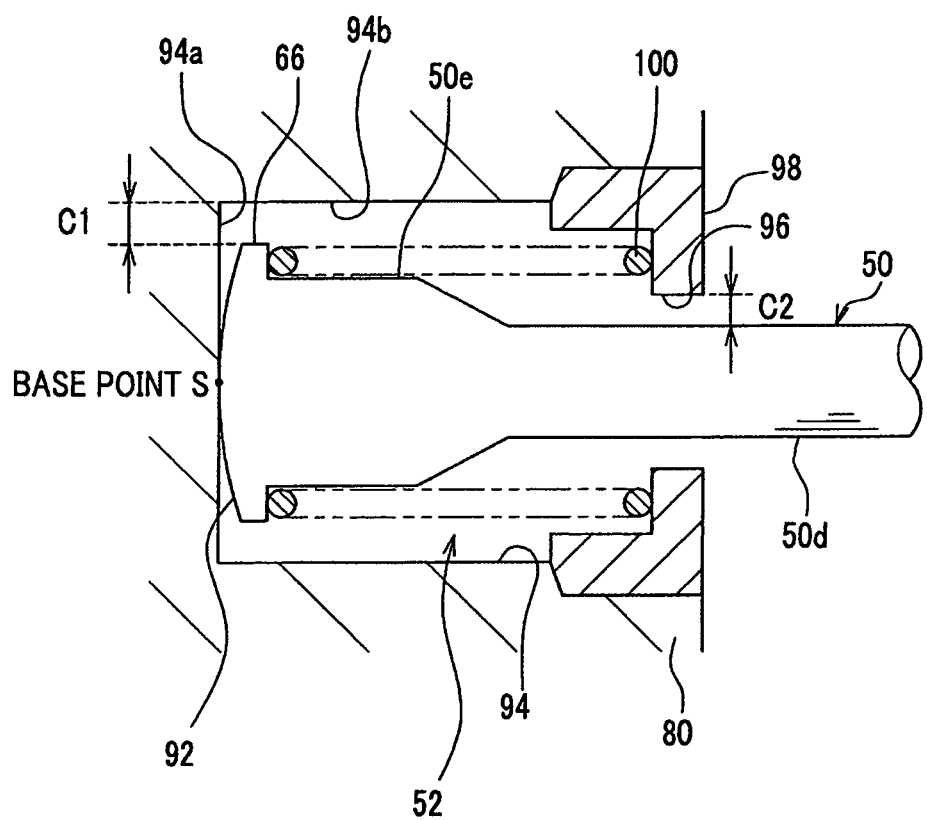
FIG. 11 is a partially enlarged longitudinal section view showing a clearance in a needle holding mechanism included in the ejector.

This needle holding mechanism 52, as shown in FIG. 11, includes a cavity 94 that is depressed with a predetermined depth in the axial direction toward the one end of the movable core 80, and into which the one end of the needle 50 including the greater diameter portion 50e is inserted; a collar portion 98 provided on the opening of the cavity 94, having an insertion hole 96 through which the needle 50 is inserted in whose center; and the spring member 100 with a smaller diameter whose one end is locked to the spring bearing portion 66 of the needle 50 and whose other end is locked to the inner wall of the collar member 98, and housed in the cavity 94 of the movable core 80.

The cavity 94 has a bottom wall 94a which is a flat face orthogonal to the axial line of the movable core 80. There is formed the partially spherical face 92 at the one end face of the needle 80 such that the partially spherical face 92 comes in one point-contact with the bottom wall 94a. Therefore, the needle 50 tiltably moves at a predetermined angle at the base point S of the partially spherical face 92 in one point-contact with the bottom wall 94a, and is held to have a degree of freedom in the radial direction.

As shown in FIG. 11, the predetermined clearance C1 in the radial direction is formed between the inner circumferential wall 94b of the cavity 94 of the movable core 80 and the outer diameter face of the spring bearing portion 66 which is an edge portion of the needle 50, and the clearance C2 in the radial direction is formed between the outer circumferential face of the middle portion 50d of the needle 50 and the inner diameter face of the insertion hole 96 of the collar member 98, thereby to secure a degree of freedom of the needle 50 in the radial direction.

Figure 12A:
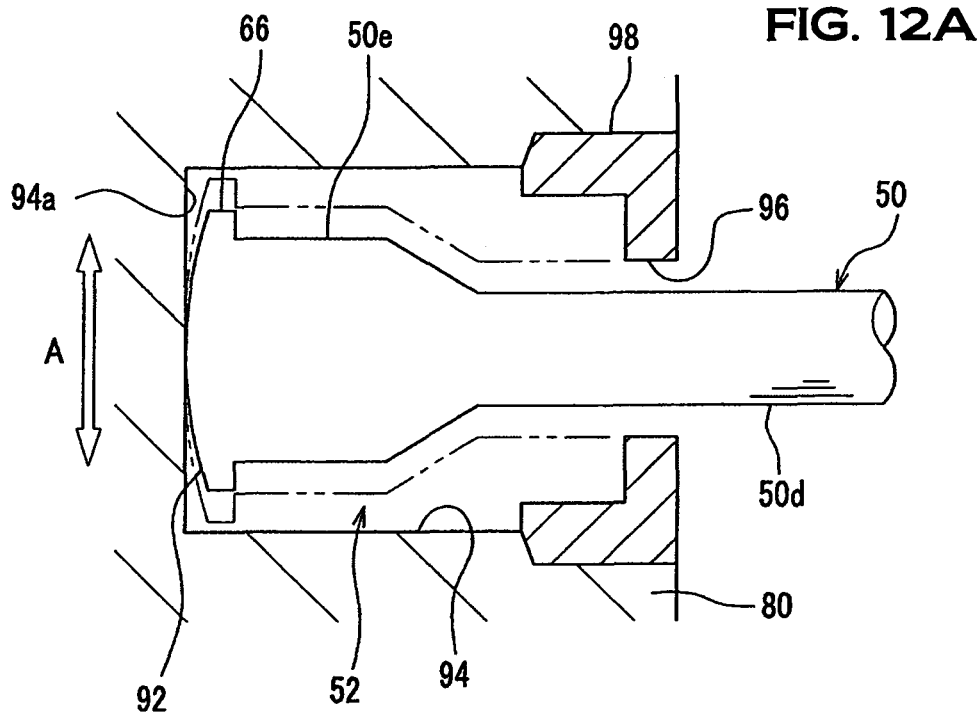
FIG. 12A is a partially enlarged longitudinal section view showing a state of a clearance that allows a displacement in the radial direction.
Figure 12B:
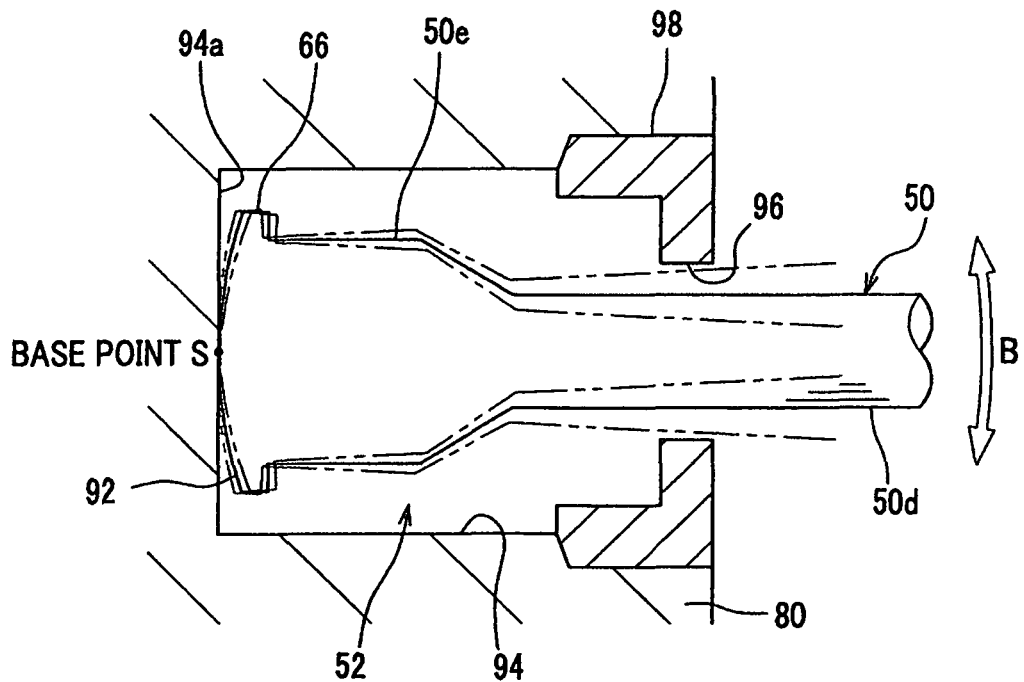
FIG. 12B is a partially enlarged longitudinal section view showing a state in which a clearance allows a tiltable displacement at a predetermined angle.

In this case, the needle 50 is set such that, as shown in the two-dot chain lines of FIG. 12A, the needle 50 can displace (slide) in the radial direction (in the arrow A direction) by the clearances C1 and C2 in a state in which the bottom wall 94a is in one point-contact with the partially spherical face 92; and as shown in the two-dot chain lines of FIG. 12B, the one end of the needle 50 portion close to the diffuser 48 can tiltably moves in the arrow B direction at a predetermined angle at the base point S of the partially spherical face 92 in one point-contact with the bottom wall 94a. After tiltably displacing at a predetermined angle, the needle 50 returns to its original position (the position represented by the solid line of FIG. 12B) by the spring force of the spring member 100.

The one end face of the needle 50 in one point-contact with the bottom wall 94a of the cavity 94 of the movable core 80 is formed to be a partially spherical face, thereby to facilitate displacement of the needle 50 in the arrow A direction and in the arrow B direction, so as to enhance degree of freedom for the contact angle of the needle 50 relative to the movable core 80.

The fuel cell system 10 including the ejector 22 according to the present embodiment is generally configured as mentioned above, and hereinafter operations and operational effects will be described.

When power generation is stopped in the fuel cell 12, hydrogen supply is shut off from the hydrogen tank 14 by using a shut-off valve not shown, so that hydrogen supply for the inlet port 32a of the ejector 22 is shut off. In such a case, the control unit controls to supply no current for the solenoid 74 (the coil 76) that constitutes the electromagnetic actuator section of the ejector 22, so as to put the solenoid 74 in a non-excitation state; and as shown in FIG. 2, the movable core 80 is in a state of being apart from the fixed core 78 in the axial direction with a predetermined distance.

Figure 13A:
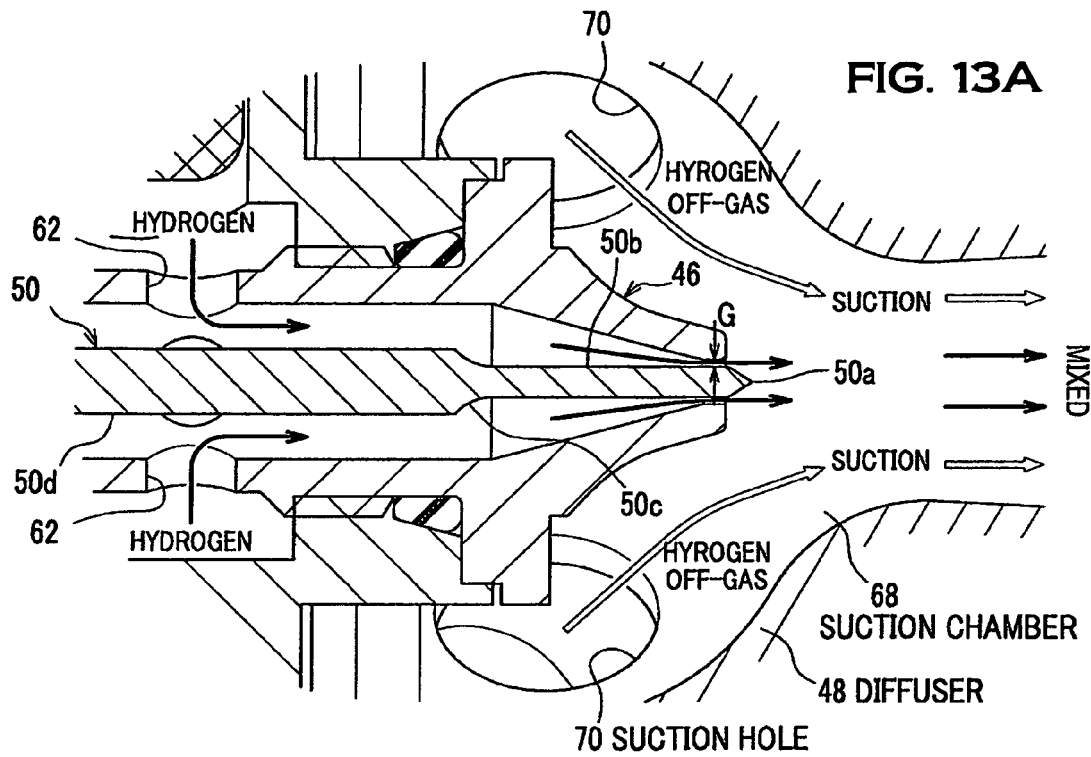
FIG. 13A is a partially enlarged longitudinal section view showing a state of a smaller discharge section area with the needle inserted through the nozzle hole.

In such a non-excitation state of the solenoid 74, as shown in FIG. 13A, the one end of the needle 50 is inserted in the nozzle hole 46a of the nozzle, and the tip end 50a of the needle 50 projects outside from the nozzle hole 46a. Thus, the longitudinal section area of the nozzle hole 46a from which hydrogen is injected is defined by subtracting the outer diameter area of the smaller diameter portion 50b of the needle 50 from the inner diameter area of the nozzle hole 46a.

On the other hand, when the fuel cell 12 performs power generation, the shut-off valve is in an open state, hydrogen is supplied from the hydrogen tank 14 via the hydrogen supply passage 20 for the anode of the fuel cell 12, and at the same time, the air compressor 16 is activated, and air humidified by the humidifier 28 is supplied via the air supply passage 26 for the cathode of the fuel cell 12.

The ejector 22 is supplied with hydrogen at a relatively high pressure from the hydrogen tank 14 through the inlet port 32a, and after grits and dusts are removed by the filter 30, the hydrogen is introduced into the first space 34a of the ejector body. The hydrogen is further led into the hollow portion 44 of the nozzle 46 through the plural hydrogen introduction hole 62 provided in the outer circumferential face of the nozzle 46, and then is injected through the gap G (see FIG. 13A) between the nozzle hole 46a and the one end of the needle 50 toward the diffuser 48.

The hydrogen accelerated by narrowing down the flow rate at the nozzle hole 46a flows through the throat portion 48b of the diffuser 48, and is supplied from the outlet port 32b through the hydrogen supply passage 20 for the fuel cell 12. In the non-excitation state of the solenoid 74, as shown in FIG. 13A, the longitudinal section are of the nozzle hole 46a becomes an area defined by subtracting the outer diameter area of the smaller diameter portion 50b at the one end of the needle 50 from the inner diameter area of the nozzle hole 46a, so that hydrogen at a relatively smaller flow rate is supplied for the fuel cell 12.

At the same time, when the hydrogen is injected (discharged) from the tip end of the nozzle 46a of the nozzle 46 toward the diffuser 48, so-called negative pressure due to a jet pump effect is caused at a portion between the nozzle 46 and the enlarged diameter portion 48a of the diffuser 48. Due to this negative pressure, hydrogen off-gas in the suction chamber 68 is suctioned, and the hydrogen injected from the nozzle 46 and the hydrogen off-gas suctioned through the suction port 32c are mixed in the diffuser 48, and then is led out from the outlet port 32b into the hydrogen supply passage 20.

In the operation state of the fuel cell 12, if hydrogen supply at a smaller flow rate is not sufficient and a relatively greater flow rate is required, the controller not shown controls to supply current for the solenoid 74 of the ejector 22 so that the solenoid 74 is put in the excitation state. Due to the excitation of the solenoid 74, the movable core 80 is attracted toward the fixed core 78 (see FIG. 3). At this time, the needle 50 is held to the movable core 80 through the needle holding mechanism 52, so that the needle 50 displaces together with the movable core 80 toward the fixed core 78.

Figure 13B:
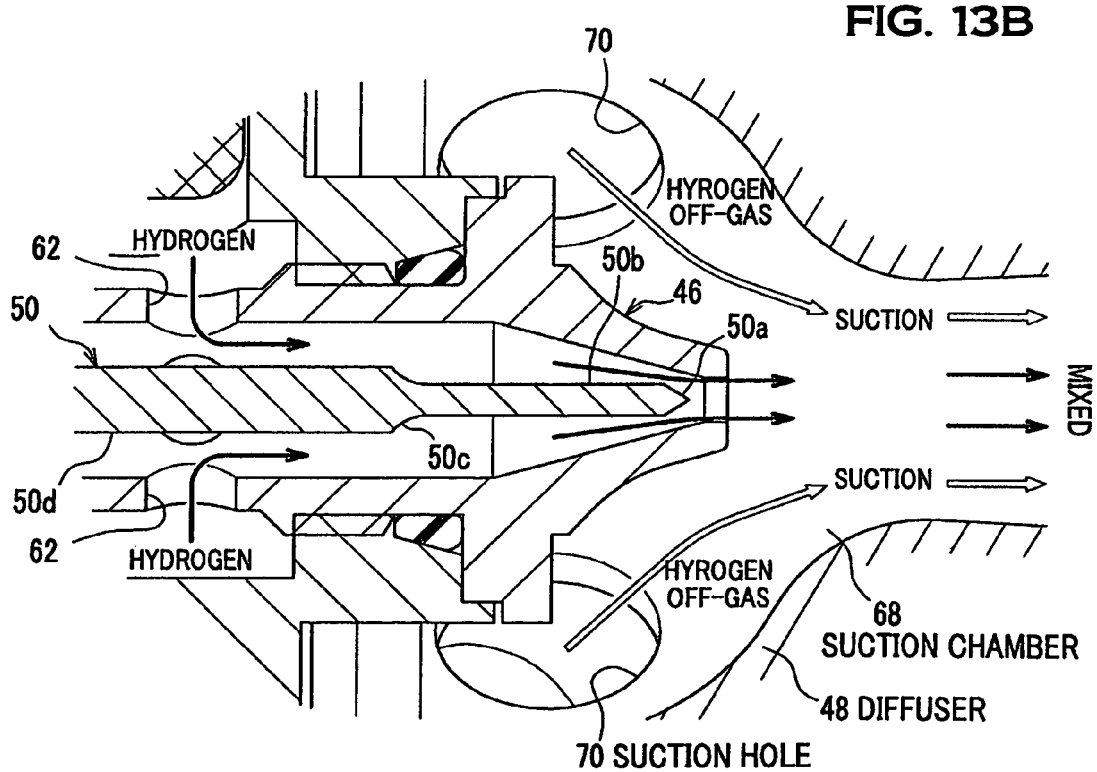
FIG. 13B is a partially enlarged longitudinal section view showing a state of a greater discharge section area with the needle apart from the nozzle hole.

Therefore, the one end of the needle 50, as shown in FIG. 13B, is in a non-insertion state to be apart from the tip end of the nozzle hole 46a in the axial direction with a predetermined distance. Accordingly, the hydrogen led into the hollow portion 44 of the nozzle 46 is injected through the entire inner diameter area of the tip end of the nozzle hole 46a toward the diffuser 48, thereby to supply hydrogen at a relatively greater flow rate for the fuel cell 12.

In this way, by switching the state of the solenoid 74 from non-excitation to excitation, the longitudinal section area of the nozzle hole 46a is changed, thereby to switch the hydrogen supply at a relatively smaller flow rate to the hydrogen supply at a relatively greater flow rate. Accordingly, within the range of an available flow rate, a stable discharge rate of hydrogen from the nozzle 46 can be secured. Meanwhile, by controlling the state of the solenoid 74 from excitation to non-excitation, the flow rate of the hydrogen supply can be switched from a relatively greater rate to a relatively smaller rate.

In the present embodiment, the bearing member 58 for axially supporting the needle 50 is installed in the hollow portion 44 inside the nozzle 46, and the needle 50 is movably supported in the axial direction so as to displace in the axial direction, so that the respective axial lines of the nozzle 46, the needle 50 and the bearing member 58 agree with one another, thereby to facilitate securing the coaxial performance among them, which realizes a stable flow rate performance of hydrogen discharged from the tip end of the nozzle hole 64a of the nozzle 46.

Specifically, since the bearing member 58 is held within the nozzle 46 having the nozzle hole 46a, the coaxial performance is enhanced between the tip end 50a of the needle 50 that slides in the axial direction of the bearing member 58 and the tip end of the nozzle hole 46a, so that the gap G (see FIG. 13A) between the tip end 50a of the needle 50 and the inner diameter of the nozzle hole 46a can be even or approximately even; and accordingly realizing a preferably stable flow rate performance of hydrogen discharged from the nozzle hole 46a.

In such a case, in the present embodiment, even if the solenoid 74 is in either state of non-excitation or excitation to vary the longitudinal section area of the nozzle hole 46a, the needle 50 sliding along the bearing member 58 is axially supported within the through hole 56 of the bearing member 58, and its coaxial performance is maintained, so that a stable flow rate performance can be secured even when the discharge rate from the nozzle 46 is varied (variable).

According to the present embodiment, between the tip end of the nozzle hole 46a at the one end of the nozzle 46 and the bearing member 58 installed at the other end portion of the nozzle 46, there is provided plural hydrogen introduction holes 62 arranged in the plural different directions (see FIG. 4B), thereby to increase the discharge (injection) efficiency of the nozzle 46 as well as to enhance the suction efficiency of the hydrogen off-gas caused by the negative pressure.

Further, according to the present embodiment, when assembling the ejector 22, the needle 50 can be centered in the axial length of the bearing member 58. Thus, due to the axial length of the bearing member 58 tilt of the needle 50 can be reduced when the needle 50 slides along the through hole 56, and also preferably prevents the tip end 50a or the smaller diameter portion 50b of the needle 50 from contacting the inner diameter portion of the tip end of the nozzle hole 46a.

In a case where the bearing member 58 axially supporting the needle 50 (or another simple member for holding the needle 50) is installed at a portion other than the inside of the nozzle 46 (e.g. at a rear portion in the axial direction of the nozzle 46 and outside the nozzle 46), it may be impossible to secure the coaxial performance between the nozzle 46 and the bearing member 58 when the nozzle 46 is installed in the ejector body due to errors of manufacturing, installation or the like; and consequently a process to secure the coaxial performance between the nozzle 46 and the bearing member 58 is required, which makes the assembling operations more complicated.

To the contrary, in the present embodiment, the bearing member 58 slidably supporting the needle 50 in the axial direction is installed inside the nozzle 46, thereby to facilitate securement of the coaxial performance between the nozzle 46 and the bearing member 58 so that the assembling operations can be simply carried out. Further, according to the present embodiment, there is no need to use special members or tools to center the needle 50, and the needle 50 can be centered simply by inserting the needle 50 through the through hole 56 of the bearing member 58 installed inside the nozzle 46, which facilitates centering of the needle 50; accordingly simplifying the assembling operations and enhancing efficiency of assembling.

Furthermore, the present embodiment sets each parameter of D1 to D4, L1 and L2 to satisfy the following formula (1), so as to facilitate holding the needle 50 (the smaller diameter portion 50b, the tip end 50a) out of contact with the inner diameter face of the nozzle hole 46a of the nozzle 46 even when the needle 50 displaces due to excitation of the solenoid 74 (see FIG. 5):

$$(D1-D2)(L1+L2)/L1 < (D4-D3)/2 \quad \text{Formula (1).}$$

Yet furthermore, the present embodiment employs such a structure that uses the singular nozzle 46, in which the needle 50 is displaced by the driving force of the electromagnetic actuator section, thereby to change the discharge longitudinal section area of the nozzle 46a where hydrogen is discharged, hence realizing a down-sizing and down-weighting of the overall ejector apparatus.

In the present embodiment, the one end of the needle 50 opposing the nozzle 46a is held by the needle holding mechanism 52 such that the needle 50 can radially move, thereby to provide predetermined degree of freedom in the radial direction for the one end of the needle 50 (see FIGS. 12A and 12B). Therefore, a radial deviation of the movable core 80 held with the one end of the needle 50 by the needle holding mechanism 52 never affects the other end (on the nozzle 46a side) of the needle 50, so that a stable flow rate performance of hydrogen discharged from the tip end of the nozzle hole 46a of the nozzle 46 can be realized.

Figure 14:
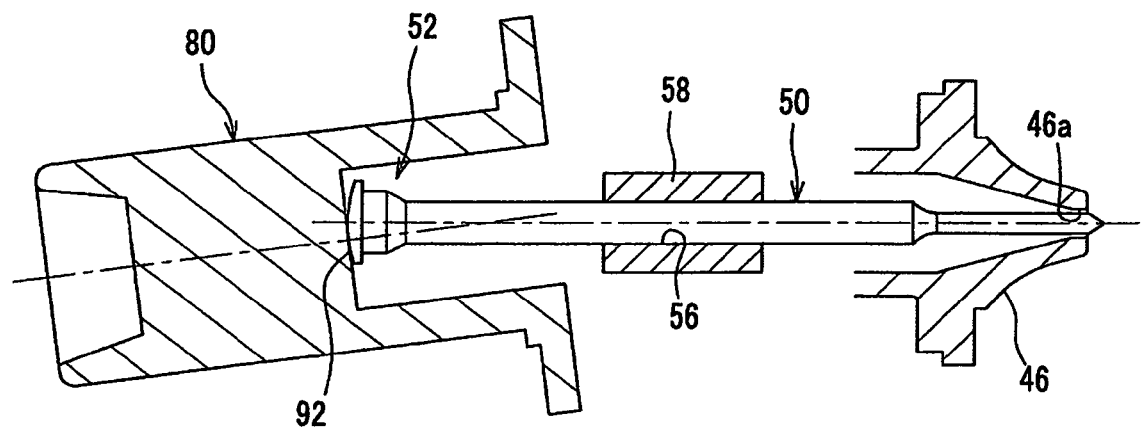
FIG. 14 is a schematic view showing a state in which the needle holding mechanism absorbs an axial deviation of the movable core, so that the needle and the nozzle are coaxially held.

In other words, in the present embodiment, for example, even if the movable core 80 has an axial deviation in the radial direction or a tilt relative to the ejector body due to manufacture errors or the like, the needle holding mechanism 52 absorbs the axial deviation (tilt) of the movable core 80, which never affects the tip end, that is, the other end (the nozzle hole 46a side) of the needle 50 (see FIG. 14). As a result, the coaxial performance between the tip end of the needle 50 moving in the axial direction of the nozzle 46 and the tip end of the nozzle hole 46a can be enhanced, so that the gap G (see FIG. 13A) between the tip end portion of the nozzle 50 and the inner diameter face of the nozzle 46a can be set to be even or approximately even, thereby to realize a preferably stable flow rate of hydrogen discharged from the nozzle hole 46a.

Assuming a case without using the needle holding mechanism 52 and integrally forming the needle 50 and the movable core 80 (into a single piece), if an axial deviation of the movable core 80 occurs in the ejector body due to manufacture errors or the like, this axial deviation of the movable core 80 affects the tip end of the needle 50 formed integrally with the movable core 80. Consequently, it becomes very difficult to secure the coaxial performance between the tip end portion of the needle 50 facing the nozzle hole 46a of the nozzle 46 and the tip end of the nozzle hole 46a. As a result, in a worst case, the tip end of the needle 50 comes in contact with the inner wall of the nozzle hole 46a, or the gap G between the tip end portion of the needle 50 and the inner diameter of the nozzle hole 46a becomes uneven; consequently preferable stability of the flow rate can not be realized.

To the contrary, in the present embodiment, even when an axial deviation of the movable core 80 occurs, this axial deviation of the movable core 80 is absorbed by the needle holding mechanism 52, and is preferably prevented from affecting the other end of the needle 50 that faces the nozzle hole 46a.

In addition, in the present embodiment, the needle holding mechanism 52 has a simple structure including the cavity 94 formed on the end face of the movable core 80, the collar member 98 installed in the cavity 94 and the spring member 100 installed between the needle 50 and the collar member 98 (see FIG. 11), thereby to realize a down-sizing and down-weighting of the overall ejector apparatus.

In addition, in the present embodiment, the one end face of the needle 50 is formed to have the partially spherical face 92, and this partially spherical face 92 of the needle 50 and the bottom wall 94a of the cavity 94 of the movable core 80 come in one point-contact with each other, so that the needle 50 can be tiltably held at a predetermined angle on this contact point as a base point S (see FIG. 12B), thereby to enhance the degree of freedom of the contact angle of the needle 50 relative to the movable core 80.

Furthermore, the present embodiment provides the first clearance C1 along the radial direction between the inner circumferential wall 94b of the cavity 94 of the movable core 80 and the outer diameter face of the spring bearing portion 66 that is the one end of the needle 50, and meanwhile, also provides the second clearance C2 along the radial direction between the inner diameter face of the insertion hole 96 of the collar member 98 and the outer diameter face of the intermediate diameter portion 50d of the needle 50 inserted through the insertion hole 96, whereby the degree of freedom in the radial direction of the needle 50 as well as the degree of freedom of the contact angle can be secured.

Specifically, the present embodiment provides the first clearance C1 between the movable core 80 and the needle 50, and also provides the second clearance C2 between the needle 50 and the collar member 98, so that the outer circumferential face of the needle 50 is set to be out of contact with the collar member 98 and the movable core 80, thereby to prevent weights (loads) of the movable core 80 and the collar member 98 from being applied to the needle 50, thus the needle 50 is affected only by its own weight. Accordingly, the needle 50 can readily be set in a free state.

In the present embodiment, the ejector 22 includes the single diffuser 48, but the present invention is not limited to this, and for example, the ejector 22 may include a not shown multiple-stage diffuser in which plural divided diffusers are provided in the axial direction of the nozzle 46 at a predetermined interval therebetween. Such a multiple-stage diffuser structure provides a suction effect not only between the nozzle 6 and an adjacent divided diffuser of the first stage, but also between the other divided diffusers of the plural stages adjacent to each other, thereby to increase the suctioned flow rate of the hydrogen off-gas from the suction chamber 68.

Figure 15A:
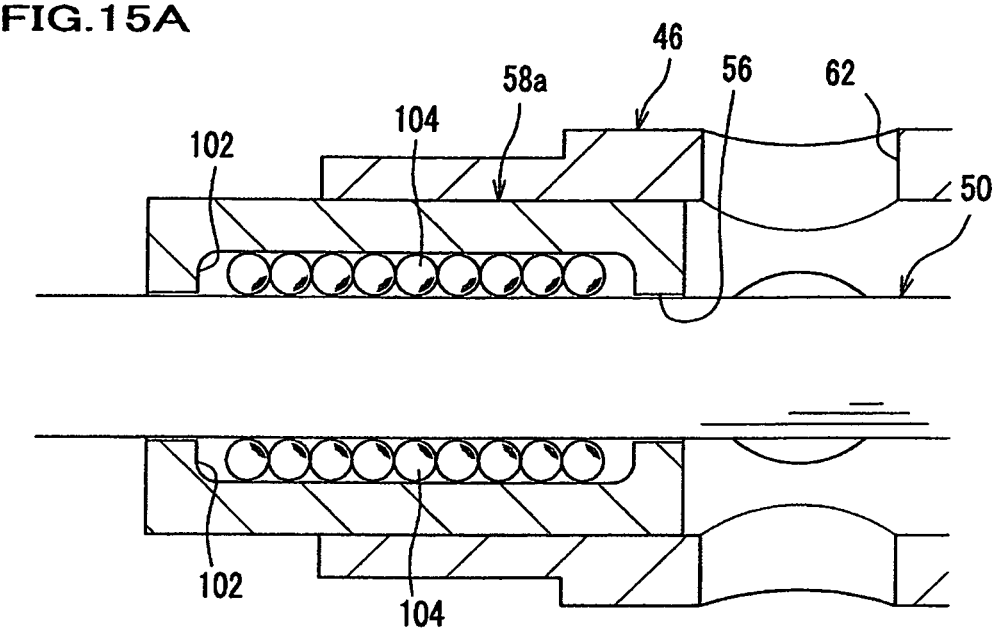
FIG. 15A is a partially enlarged longitudinal section view showing a state of the needle axially supported by plural ball bearings.

The present embodiment illustrates the bearing member 58 using a sliding type bearing having the through hole 56 of the cylindrical body through which the needle 50 slides, but the present invention is not limited to this, and as shown in FIG. 15A for example, there may be provided plural ball rotation grooves 102 in array, extending along the axial direction of the inner wall of the through hole 56 of the bearing member 58a, and plural ball bearings 104 are installed in the ball rotation grooves 102 so as to rotationally move to hold the needle 50.

Figure 15B:
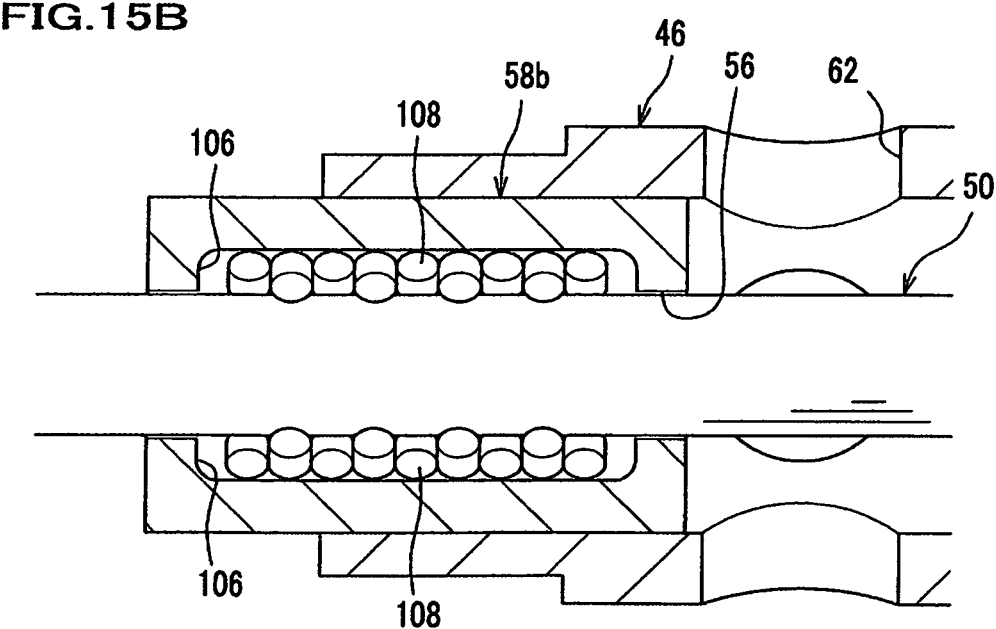
FIG. 15B is a partially enlarged longitudinal section view showing a state of the needle axially supported by plural cylindrical roll bearings.
Figure 15C:
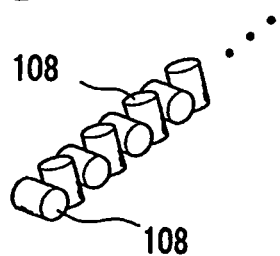
FIG. 15C is a perspective view of the plural cylindrical roll bearings of FIG. 15B.

Furthermore, not shown V-shaped grooves in a cross section view are provided on the outer circumferential face of the needle 50 in the axial direction, and on the inner wall of the through hole 56 of the bearing member 58b, there are provided V-shaped grooves 106 in a cross section view opposing said V-shaped grooves, and plural cylindrical roll bearings 108 are installed in these two sets of grooves such that the two adjacent roll bearings are arranged at a 90 degree with each other (see FIGS. 15B and 15C), and the plural roll bearings 108 rotationally move so as to axially support the needle 50. Such a roll bearing structure can stably support the needle 50.

Next, the present embodiment provides the stopper 87 of elastic material that comes in contact with one of other members (such as the cover plate 40 or the first block 36a) so as to restrict displacement of the movable core 80, and the stopper 87 is provided on the front and back face of the annular flange 80a that radially projects outward from the one end of the movable core 80. The present embodiment provides the stopper 87 so that, when the movable core 80 displaces toward the fixed core 78 due to excitation of the solenoid 74, the semi-spherical projection 87b on the one side of the stopper 87 abuts the second annular step portion 40b of the cover plate 40 as one of other members, and provides a buffer effect thereby to reduce collision noises and vibrations (see FIG. 8). Therefore, the movable core 80 is prevented from coming in contact with the fixed core 78; and accordingly operation noises and vibrations can be preferably prevented from propagating to the fuel cell vehicle interior not shown.

Meanwhile, in the present embodiment, when the solenoid 74 becomes unexcited and the movable core 80 returns to the original position due to the spring force of the return spring force 88, the semi-spherical projection 87b on the other side of the stopper 87 abuts the end face of the first block 36a of metal material as one of other members and provides a buffer effect, so that the collision noises and vibrations can be reduced (see FIG. 6). Accordingly, the movable core 80 can be prevented from abutting the end face of the first block 36a, and operation noises and vibrations can be preferably prevented from being propagated to the fuel cell vehicle interior not shown.

In other words, the present embodiment provides the stopper 87 of elastic material that restricts displacement of the movable core 80 on the front and back face of the annular flange 80a in the operational direction of the movable core 80, thereby to buffer and reduce noises and vibrations occurring when the movable core 80 operates, and to prevent such noises and vibrations from propagating to the vehicle interior. Accordingly, quietness can be secured in the vehicle interior and so-called NVH (Noise Vibration and Harshness) performance can be enhanced.

When the movable core 80 is attracted and displaces toward the fixed core 78 due to excitation of the solenoid 74, the present embodiment provides the gap 93 (see FIGS. 7 and 10A) between the dent portion 89 of the movable core 80 and the projection portion 91, each of which opposes the other, so as to prevent the movable core 80 from coming in contact with the fixed core 78 even if the semi-spherical projection 78b formed on the stopper 87 gets worn over time, thereby to prevent the movable core 80 from being attracted to the fixed core 78 due to remanence.

In addition, the present embodiment provides the semi-spherical projection 87b on the stopper 87 which comes in one-point contact with one of other members (such as the first block 36a or the cover plate 40), so that the stopper 87 can readily get apart from the one of other members after coming in contact with it, which makes so-called adhesive property smaller.

Furthermore, the present embodiment employs a structure using the single nozzle 46, and changes the discharge longitudinal section area of the nozzle hole 46a from which hydrogen is discharged by displacing the needle 50 with the driving force of the electromagnetic actuator section, thereby to realize a down-sizing and down-weighting of the overall ejector apparatus.

Next, in the present embodiment using the horizontally-installed solenoid 74, the projection portion 91 is formed at the end portion of the fixed core 78 facing the movable core 80, and the dent portion 89 having a diameter gradually decreased as apart from the fixed core 78 is also provided at the end face of the movable 80 facing the fixed core 48, thereby to increase the displace rate (stroke rate) of the movable core 80 so that abrasion due to a strong friction caused by the movable core 80 can be reduced. Hereinafter, this will be described in detail.

First, in the light of layout of the overall ejector apparatus, it is assumed to employ a (horizontal-installed) solenoid 74 in a horizontal installation state that displaces the movable core 80 in the horizontal direction, in order to reduce the longitudinal size of the ejector apparatus for a size/weight reduction purpose.

Figure 16A:
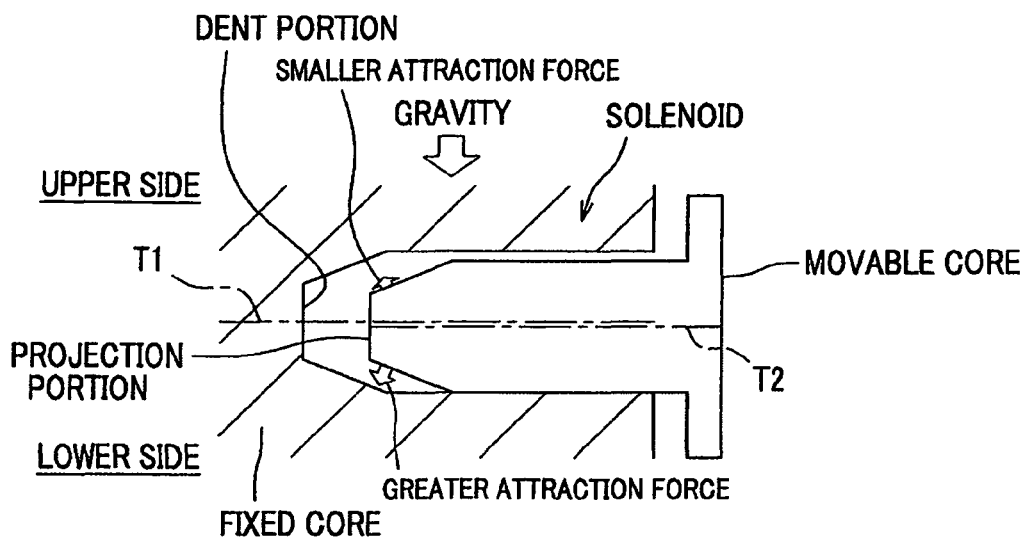
FIG. 16A is a schematic view showing an operation of a conventional horizontally-installed type solenoid according to a comparison example.
Figure 16B:
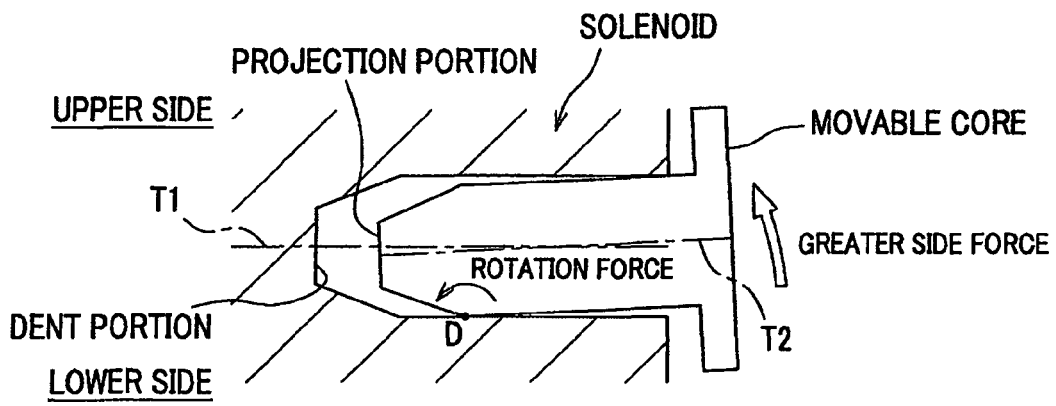
FIG. 16B is a schematic view showing an operation of a conventional horizontally-installed type solenoid according to a comparison example.
Figure 16C:
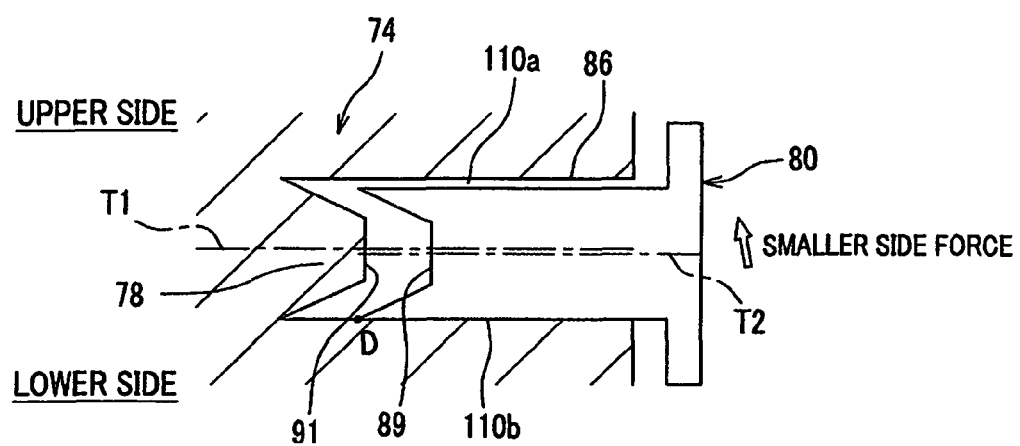
FIG. 16C is a schematic view showing an operation of a horizontally-installed type solenoid according to the present embodiment.

In such a horizontal-installed solenoid 74, generally, the movable core 80 has the upper clearance (a clearance between the inner wall ceiling face of the cylindrical portion 86 and the outer diameter face of the movable core 80) 110a and the lower clearance (an almost zero clearance between the inner wall bottom face of the cylindrical portion 86 and the outer diameter face of the movable core 80) 110b, both the clearances become different from each other due to the empty weight thereof (therefore, the upper clearance 110a naturally becomes greater than the lower clearance 110b), and a small axial deviation occurs between the axial line T1 of the cylindrical portion 86 (the fixed core 78) covering the outer circumferential face of the movable core 80 and the axial line T2 of the movable core 80; therefore, the movable core 80 may be set to move with being axially deviated (see FIG. 16C).

In such a case, in order to prevent abrasion of the movable core 80 as well as to increase displace rate (stroke rate) of the movable core 80, taking into account the distance between the movable core 80 and the fixed core 78a, and attraction force and magnetic property occurring in the solenoid 74, it may be considered to make each opposing end face of the movable core 80 and the fixed core 78 be not a flat face but a tapered face.

FIGS. 16A and 16B show a schematic example of a conventional horizontally-installed solenoid according to a comparative example, in which there is provided on one end of a movable core a projection portion that projects toward the fixed core, and the outer face of this projection portion is formed to be tapered, and there is also provided a dent portion on one end of a fixed core facing the movable core, and this dent portion has an inverse tapered shape corresponding to the tapered portion of the projection portion. In this case, the conventional solenoid according to the comparative example, the upper clearance is different from the lower clearance due to the empty weight, so that the axial line T2 of the movable core and the axial line T1 of the sliding hole are non-coaxially deviated.

The conventional solenoid according to the comparative example, as shown in FIG. 16A, a gap between the tapered face of the projection portion of the movable core and the inverse tapered face of the dent portion of the fixed core becomes greater at the upper side and becomes smaller at the lower side. Therefore, the attraction force of the lower side due to excitation of the solenoid becomes greater; on the other hand, the attraction force of the upper side becomes smaller. Thus, due to such uneven attractions, side force (lateral force) to rotate the movable core around the point D occurs in the arrow direction.

This side force results from a thrust force occurring in a different direction from the axial direction of the movable core, and hinders straight progress of the movable core. In the conventional solenoid according to the comparative example, a corner with an obtuse angle is formed around a boundary portion between the tapered face and the circumferential face of the movable core, and a seesaw movement occurs on the point D that is an apex of this corner, as a center of the seesaw movement. Consequently, in the conventional solenoid according to the comparative example, abrasion resulted from a strong friction of the movable core caused by the side force occurs, which brings a difficulty of deteriorating durability of the movable core.

To the contrary, in the horizontally-installed type solenoid 74 according to the present embodiment, as shown in FIG. 16C, the dent portion 89 recessed toward the direction apart from the fixed core 80 is formed at the end portion of the movable core facing the end face portion of the fixed core 78, and also the projection portion 91 having a shape corresponding to the dent portion 89 is provided at the end face portion of the fixed core 78 facing the end portion of the movable core 80, thereby to reduce abrasion due to a strong friction caused by the side force as less as possible, so as to enhance the duration.

Specifically, the horizontally-installed type solenoid 74 according to the present embodiment hinders occurrence of a seesaw movement because the rotation center (the point D) due to side force is set to be outside the attraction force (electromagnetic force caused by the solenoid 74); meanwhile, in the horizontally-installed solenoid according to the comparative example, since the rotation center (the point D) due to side force is set to be inside the attraction force (electromagnetic force caused by the solenoid), a seesaw movement occurs at the rotation center as a base point, which causes abrasion due to a strong friction.

Figure 17:
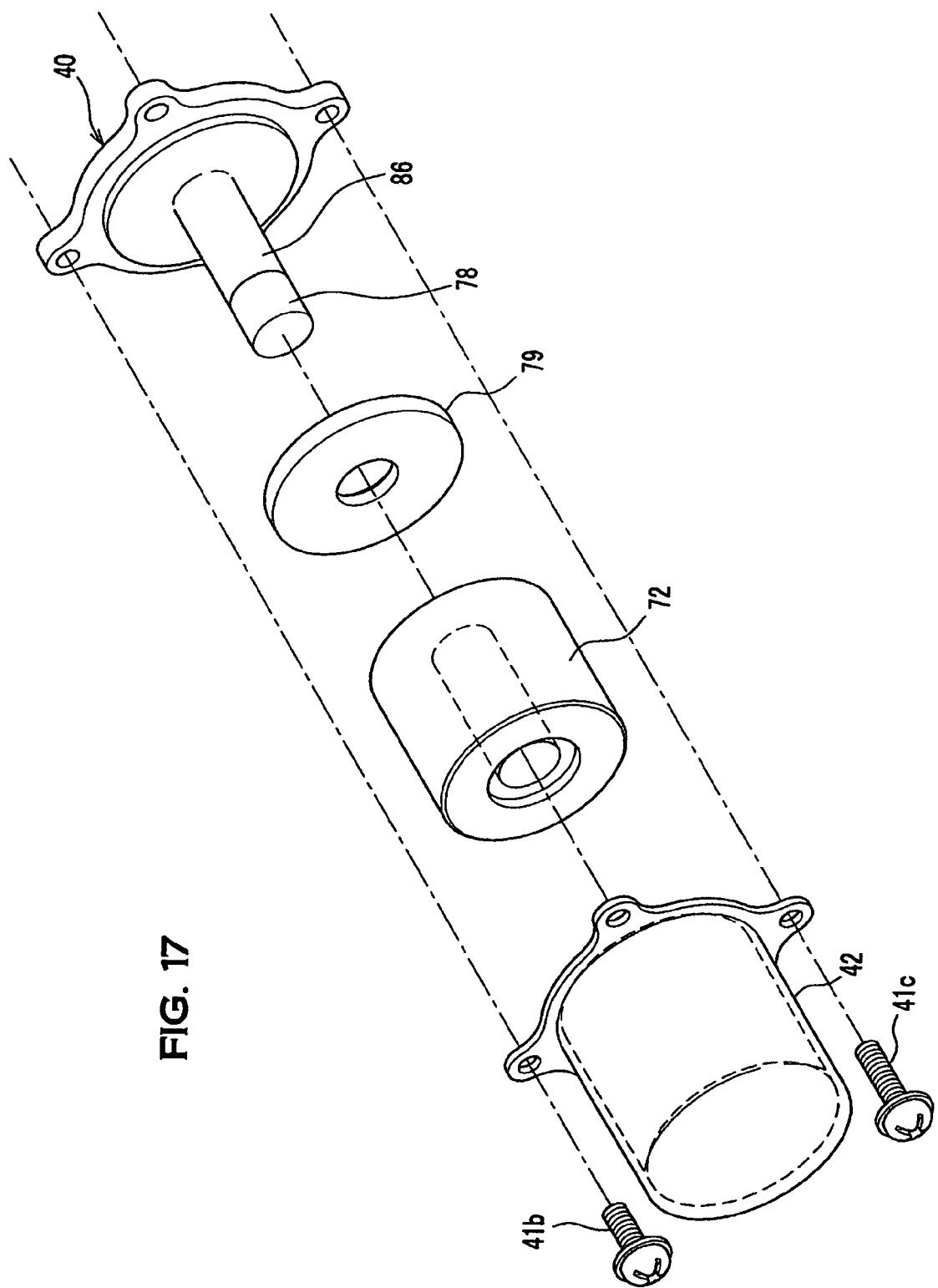
FIG. 17 is a perspective view showing how to assemble elements included in an electromagnetic actuator section.

Furthermore, in the present embodiment, the weight of the coils 76 covered by the resin seal 72 is never applied to the cylindrical portion 86 with a thin thickness, thereby to preferably prevent deformation of the cylindrical portion 86 serving as a guide that linearly guides the movable core 80. Hereinafter, a support structure of the resin seal 72 (the coil 76) will be described in detail, with reference to FIG. 17 showing how to assemble the support structure.

When assembling the electromagnetic actuator section, the fixed core 78, in a state of being fixed to the end portion of the cylindrical portion 86 on the cover plate 40 by welding or the like, is inserted along the axial line of the fixed core 78 and the cylindrical portion 86 through the intermediate plate 79 and the resin seal 72 in which the coils 76 are installed, and then the cover plate 40 is tightly fixed to the flange of the housing 42 having a cylindrical body with a bottom by being screwed up with the screw members 41b, 41c, so as to integrally assemble them (see FIG. 6). The resin seal 72 serves as a coil winding body with the coil 76 wounded.

In this case, a predetermined clearance 81 between the outer diameter face of the resin seal 72 and the inner diameter face of the housing 42 is formed along the radial direction, and the resin seal 72 is held out of contact with the housing 42, and is held at both ends thereof in the axial direction between the intermediate plate 79 (the cover plate 40) and the bottom of the inner wall face of the housing 42.

Specifically, the clearance 81 puts the resin seal 72 in a free state in the radial direction from the housing 42, and at the same time, the resin seal 72 is pushed and held in the axial direction between the intermediate plate 79 and the inner bottom face of the housing 42 by being screwed up with the screw members, so that the weight of the coil 76 installed in the resin seal 72 can be prevented from being applied to the cylindrical portion 86 inserted into the resin seal 72, thereby to prevent deformation of the cylindrical portion 86.

As shown in FIG. 6, another predetermined clearance 83 is formed in advance between the end face of the fixed core 78 in the axial direction and the inner bottom face of the housing 42. With this clearance 83, deformation of the cylindrical portion 86 can be prevented when the inner bottom face of the housing 42 abuts the end face of the fixed core 78 in assembling the electromagnetic actuator section.

Figure 10A:
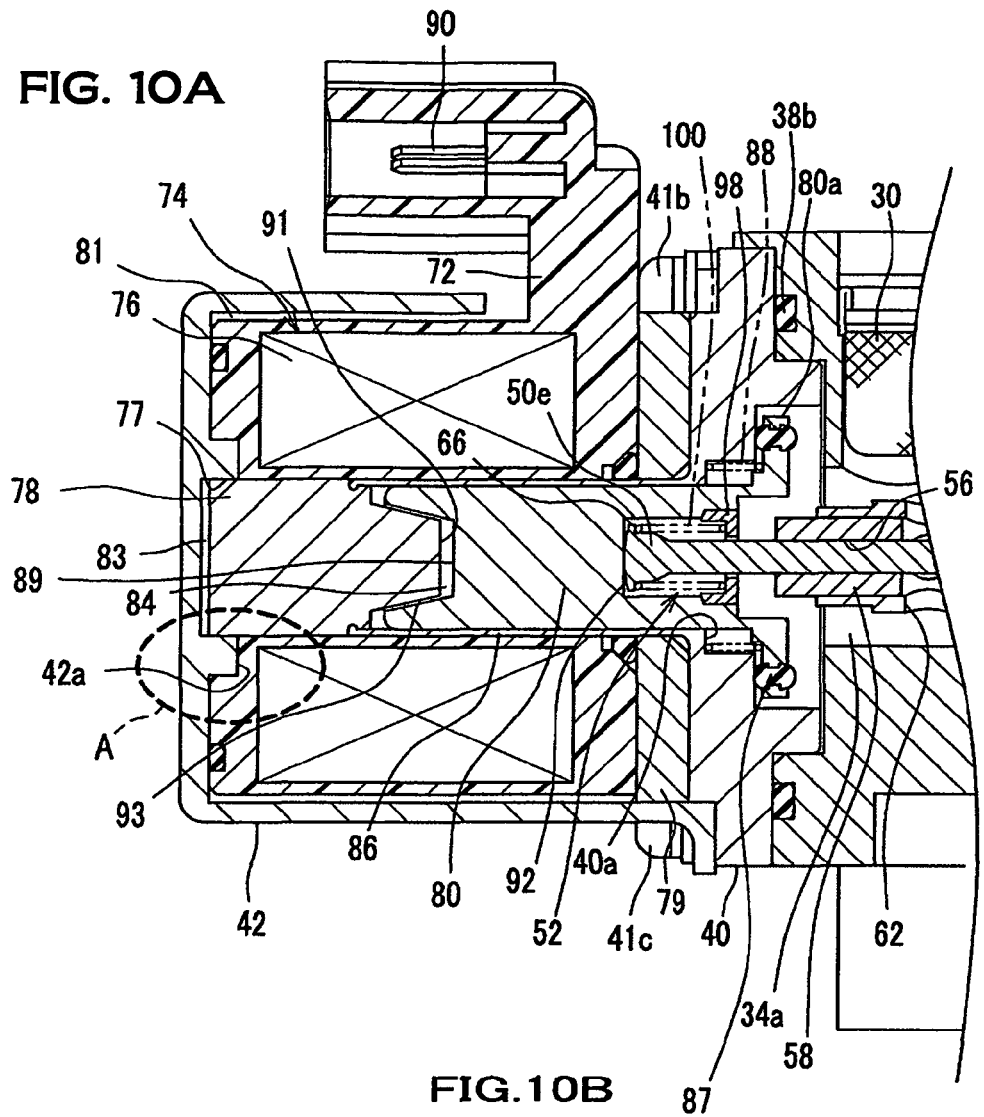
FIG. 10A is a partially enlarged longitudinal section view showing a gap between the movable core and the fixed core.
Figure 10B:
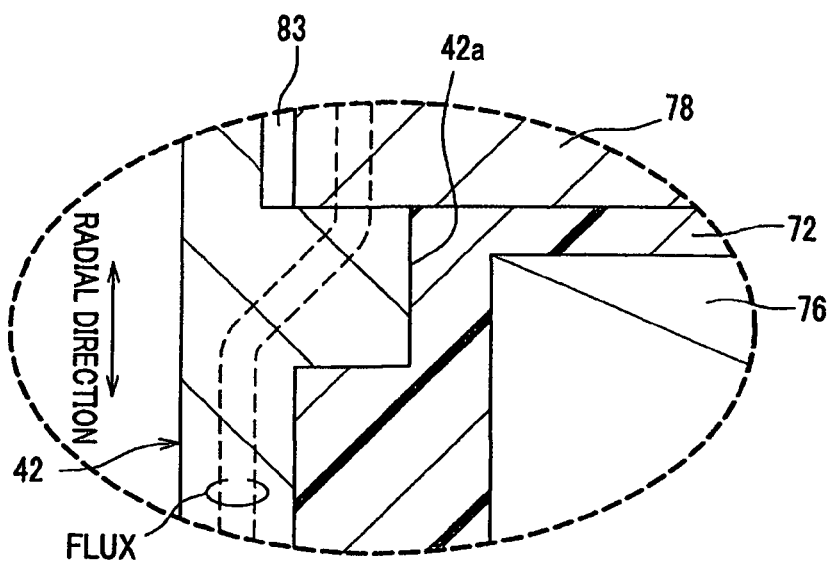
FIG. 10B is a partially enlarged section view showing a flow of flux in a circle A of FIG. 10A.

In addition, as shown in FIGS. 10A and 10B, the present embodiment provides on the inner bottom face of the housing 42 the annular projection 42a that holds the end portion of the fixed core 78, so that flux can be relayed between the annular projection 42a and the fixed core 78. Consequently, in the present embodiment, flux can be relayed in the radial direction through the annular projection 42a functioning as a flux relay portion, which increases flux density and enhances attraction force of the movable core 80. In stead of providing the annular projection 42a, an annular recess portion may be formed for the same effect.

In this case, the solenoid 74 is not required for accuracy in size in the axial direction (thrust direction), which is orthogonal to the radial direction, thus to provide an advantage of simplifying the structure of the solenoid.

As mentioned above, the present invention has been described in detail.

Hereinafter, the effects of the present invention will be described in detail.

According to the present invention, there is provided the bearing member that axially supports the needle in the hollow portion of the nozzle, and the through hole formed in the bearing member movably supports the needle in the axial direction, thereby to allow the axial lines of the nozzle, the needle and the bearing member to agree with one another and facilitate securing coaxial performance thereof, accordingly to realize a stable flow rate of fuel gas discharged from the tip end of the nozzle hole of the nozzle.

In other words, the bearing member is held inside the nozzle having the nozzle hole, so as to enhance coaxial performance between the tip end portion of the needle displacing in the axial direction of the bearing member and the tip end of the nozzle hole, and the gap between the tip end portion of the needle and the inner diameter face of the nozzle hole is set to be even or approximately even, thereby to realize preferably stable flow rate of fuel gas discharged from the nozzle hole.

If the bearing member axially supporting the needle is provided at a portion other than inside the nozzle (such as a portion distantly outside the nozzle, along the axial direction opposite to the nozzle hole), the coaxial performance with the bearing member may not be secured due to manufacture errors or installation errors when installing the nozzle in the ejector body, which may require an operation for obtaining the coaxial performance between the nozzle and the bearing member, and this makes the assembling operation complicated.

To the contrary, the present invention provides inside the nozzle the bearing member movably supporting the needle in the axial direction, thereby to facilitate securing the coaxial performance between the nozzle and the bearing member, so that the assembling operation can be performed easily.

In the present invention, since the needle displacing in the axial direction of the bearing member is supported within the through hole of the bearing member so as to maintain the coaxial performance therebetween, a stable flow rate of fuel gas can be obtained even when the longitudinal section area of the nozzle hole from which fuel gas is discharged varies by the nozzle-hole section area regulating mechanism and discharge rate from the nozzle is changed (varies).

The present invention provides on the outer circumferential face of the nozzle in the radial direction plural fuel gas introduction holes that introduce fuel gas supplied from the inlet port of the ejector body into the hollow portion of the nozzle, thereby to increase discharge (injection) efficiency of the nozzle, as well as to enhance suction efficiency of fuel off-gas caused by negative pressure.

In addition, the present invention provides the bearing member of a cylindrical body having a through hole along the axial direction, which satisfies the following formula (1), so as to hold the needle to be out of contact with the inner diameter face of the nozzle hole of the nozzle:

$$(D1-D2)(L1+L2)/L1 < (D4-D3)/2 \quad \text{Formula (1)}$$

where,
D1: the inner diameter of the through hole of the bearing member
D2: the outer diameter of the needle at a portion thereof axially supported by the bearing member
D3: the outer diameter of the needle at a portion thereof inserted in the nozzle hole
D4: the inner diameter of the nozzle hole of the nozzle
L1: the axial length of the bearing member
L2: the axial distance between the bearing member and the nozzle hole.

The present invention sets the parameters of D1 to D4, L1 and L2 to satisfy the above formula (1), thereby to easily hold the needle to be out of contact with the inner diameter face of the nozzle hole of the nozzle when the needle displaces.

In the present invention, the needle holding mechanism holds the one end of the needle opposing the nozzle hole such that the needle can displace in the radial direction, so that the one end of the needle is set to obtain a predetermined degree of freedom in the radial direction. Therefore, even if the movable core that contacts the one end portion of the needle radially deviates, this deviation does not affect the other end portion (the nozzle hole portion side) opposing the one end portion of the nozzle through the needle holding mechanism, so that a stable flow rate of fuel gas discharged from the tip end of the nozzle hole of the nozzle can be obtained.

In other words, for example, if the axis of the movable core radially deviates relative to the ejector body due to manufacture errors or the like, such an axial deviation of the movable core can be absorbed by the needle holding mechanism, and never affects the tip end portion, that is, the other end portion of the needle (the nozzle hole portion side). Accordingly, the coaxial performance between the tip end portion of the needle that displaces in the axial direction of the nozzle and the tip end of the nozzle hole can be enhanced, and the gap between the tip end portion of the needle and the inner diameter face can be set to be even or approximately even, thereby to realize a preferable stable flow rate of fuel gas discharged from the nozzle hole.

Assuming a case without such a needle holding mechanism in which the needle and movable core are integrally formed, the axis of the movable core may deviate in the ejector body due to manufacture errors or the like, and this axial deviation of the movable core may affect the tip end portion of the needle integrally formed wit the movable core. Therefore, it becomes difficult to secure the coaxial performance between the tip end portion of the needle facing the nozzle hole of the nozzle and the tip end of the nozzle hole. Consequently, in a worst case, the tip end portion of the needle comes in contact with the inner wall of the nozzle hole, or the gap between the tip end portion of the needle and the inner diameter face of the nozzle hole becomes uneven, and a preferably stable flow rate cannot be obtained.

To the contrary, in the present invention, even if the axis (center) of the movable core deviates, the needle holding mechanism absorbs (accepts) this axial deviation of the movable core, and this axial deviation can be prevented from propagating to the other end portion of the needle facing the nozzle hole.

The present invention provides the needle holding mechanism in a simple structure that includes the cavity formed in the movable core, the collar member installed in the cavity, and the spring member installed between the needle and the collar member, thereby to realize a down-sizing and down-weighting of the overall ejector apparatus.

In the present invention, the partially semi-spherical face is formed on the one end face of the needle, and this partially semi-spherical face allows the needle to come in one-point contact with the movable core, so that the needle is tiltably held at a predetermined angle at this contact point as a base point, which enhances degree of freedom of the contact angle of the needle relative to the movable core.

In addition, the present invention provides the first clearance in the radial direction between the inner wall face of the cavity of the movable core and the one end of the needle, and also provides the second clearance in the radial direction between the inner diameter face of the insertion hole formed on the collar member and the outer diameter face of the needle that is inserted through this insertion hole, thereby to secure degree of freedom in the radial direction of the needle as well as degree of freedom of the contact angle.

In other words, the present invention provides the first clearance between the movable core and the needle, as well as provides the second clearance between the needle and the collar member, so that the outer circumferential face of the needle is set to be out of contact with the collar member and the movable core, and thus the weight of the movable core is not applied to the needle, which has only its own weight. Accordingly, the degree of freedom of the needle can be readily secured.

Furthermore, the present invention provides the stopper of elastic material that abuts other members so as to restrict displacement of the movable core; and when the movable core displaces toward the fixed core side due to excitation of the solenoid, the stopper abuts other members, providing a buffer effect, thereby to reduce collision noises and vibrations. Accordingly, the movable core can be prevented from abutting the fixed core, and operation noise and vibrations can be prevented from propagating to the fuel cell vehicle interior.

Meanwhile, in the present invention, when the solenoid becomes unexcited and the movable core returns to its original position, the stopper abuts other members, serving as a buffer, thereby to reduce collision noises and vibrations. Thus, the movable core can be prevented from abutting other members, so that operation noises and vibrations can be preferably prevented from propagating to the fuel cell vehicle interior.

As described above, the present invention provides the movable core with the stopper of elastic material that restricts displacement of the movable core, thereby to buffer and restrict noises and vibrations due to operations of the movable core, and to prevent such noises and vibrations from propagating to the fuel cell vehicle interior. Accordingly, quietness of the vehicle interior can be secured, so as to enhance so-called NVH performance.

In the present invention, the movable core is attracted and displace to the fixed core due to excitation of the solenoid, and the gap is provided between the movable core and the fixed core opposing the movable core, so that even if the stopper gets abraded (deteriorated) due to secular change, a contact between the movable core and the fixed core can be prevented, thereby to prevent the movable core from being attracted to the fixed core due to remanence.

In addition, since the present invention provides the dent portion at the end portion of the movable core, as well as provides the projection portion corresponding to this dent portion at the end portion of the fixed core, in which the dent and projection portions opposing each other, it is possible to increase displacement rate of the movable core and reduce abrasion of the movable core, so as to enhance durability of the movable core, in comparison to a case in which each end face of the movable core and the fixed core opposing each other is formed to be flat. In this case, the present invention can reduce abrasion due to a strong friction caused by a side force (lateral force), as well as enhance sliding performance of the movable core.

The present invention employs the housing of a cylinder body with a bottom in which the solenoid is housed, and when the housing is fixed to other members of the ejector body in such a manner that the coil winding body with the coil wounded is held at each end portion thereof in the axial direction, it may be preferable to provide the clearance in the radial direction between the inner diameter face of the housing and the outer diameter face of the coil winding body.

Specifically, the present invention holds the coil winding body with a relatively heavy weight at each end portion thereof in the axial direction between one of other members of the ejector body and the housing, and provides another clearance in the radial direction between the inner diameter face of the housing and the outer diameter face of the coil winding body, thereby to hold the coil winding body to be out of contact with the housing. Accordingly, in the present invention, the weight of the coil winding body is prevented from being applied to the guide portion that covers the outer circumferential face of the movable core to guide it, so that deformation of the guide portion can be preferably prevented.

In addition, the present invention provides on the inner wall of the housing the flux relay portion that relays flux to the fixed core, so as to relay flux in the radial direction, which can increase flux density and enhance attraction of the movable core.

However the present invention is not limited to those specific embodiments, and various modifications and changes thereto can be made by persons skilled in the art without departing from the scope and spirit of the invention as set forth in the following claims.

What is claimed is:

1. An ejector for a fuel cell system comprising:
an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell;
a nozzle having a nozzle hole for discharging fuel gas supplied via the inlet port;
a diffuser for mixing the fuel gas discharged from the nozzle hole and a fuel off-gas discharged and returned via the circulation passage from the fuel cell;
a nozzle-hole section area regulating mechanism including a needle axially extending in a hollow portion of the nozzle, the nozzle moving forward and backward in the nozzle hole so as to regulate a discharge section area of the nozzle hole; and
a bearing member held in the hollow portion of the nozzle and having a through hole through which the needle is movably supported in the axial direction, wherein
on a radial circumferential face of the nozzle, there are provided plural fuel gas introduction holes that introduce the fuel gas supplied from the inlet port into the hollow portion of the nozzle.

2. An ejector for a fuel cell system comprising:
an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell;
a nozzle having a nozzle hole for discharging fuel gas supplied via the inlet port;
a diffuser for mixing the fuel gas discharged from the nozzle hole and a fuel off-gas discharged and returned via the circulation passage from the fuel cell;
a nozzle-hole section area regulating mechanism including a needle axially extending in a hollow portion of the nozzle, the needle moving forward and backward in the nozzle hole so as to regulate a discharge section area of the nozzle hole; and
a bearing member held in the hollow portion of the nozzle and having a through hole through which the needle is movably supported in the axial direction, wherein
the bearing member is formed of a cykindrical body having the through hole in the axial direction, and
by satisfying the following formula, the needle is held to be out of contact with an inner diameter face of the nozzle hole of the nozzle:

$$(D1-D2)(L1+L2)/L1<(D4-D3)/2$$

where
D1: an inner diameter of the through hole of the bearing member
D2: an outer diameter of the needle at a portion thereof axially supported by the bearing member
D3: an outer diameter of the needle at a portion thereof inserted in the nozzle hole
D4: an inner diameter of the nozzle hole of the nozzle
L1: an axial length of the bearing member
L2: an axial distance between the bearing member and the nozzle hole.

3. An ejector for a fuel cell system comprising:
an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell;
a nozzle having a nozzle hole for discharging fuel gas supplied via the inlet port;
a diffuser for mixing the fuel gas discharged from the nozzle hole and a fuel off-gas discharged and returned via the circulation passage from the fuel cell;
a nozzle-hole section area regulating mechanism including a needle axially extending in a hollow portion of the nozzle, the needle moving forward and backward in the nozzle hole so as to regulate a discharge section area of the nozzle hole;

a bearing member held in the hollow portion of the nozzle and having a through hole through which the needle is movably supported in the axial direction;

an electromagnetic actuator that includes a movable core attracted to a fixed core due to a coil excitation and displaces the needle along with the movable core in the axial direction; and a needle holding mechanism provided between the movable core and the needle, and holding one end portion of the needle on an opposite side of the nozzle hole in such a manner that the held one end of the needle moves in the radial direction.

4. The ejector for a fuel cell system as set forth in the claim 3, wherein the needle holding mechanism comprises a cavity provided in the movable core and in which the one end of the needle is inserted; a collar member provided on an opening of the cavity and having a insertion hole through which the needle is inserted; and a spring member that is housed in the cavity, and whose one end is locked to the needle and whose other end is locked to the collar member.

5. The ejector for a fuel cell system as set forth in the claim 3, wherein there is formed on one end face of the needle a partially spherical face, through which the needle is set to come in one-point contact with the movable core.

6. The ejector for a fuel cell system as set forth in the claim 4, wherein a first clearance is provided in the radial direction between an inner wall face of the cavity of the movable core and an outer diameter face of the one end of the needle, and a second clearance is provided in the radial direction between an inner diameter face of the through hole of the collar member and an outer diameter face of the needle.

7. An ejector for a fuel cell system comprising:

an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell;

a nozzle having a nozzle hole for discharging fuel gas supplied via the inlet port;

a diffuser for mixing the fuel gas discharged from the nozzle hole and a fuel off-gas discharged and returned via the circulation passage from the fuel cell;

a nozzle-hole section area regulating mechanism including a needle axially extending in a hollow portion of the nozzle and for regulating a discharge section area of the nozzle hole;

a solenoid including a movable core that displaces along with the needle toward a fixed core due to a coil excitation; and a stopper of elastic material provided on the movable core, the stopper configured to abut an adjacent member that is external to the movable core so as to restrict the displacement of the movable core.

8. The ejector for a fuel cell system as set forth in the claim 7, wherein the stopper includes an annular body that is provided on an annular flange outwardly projecting in the radial direction from one end portion of the movable core, the annular body installed in a groove circumferentially formed on the annular flange, and plural projections that project in the axial direction of the movable core from a flat face of the annular body.

9. The ejector for a fuel cell system as set forth in the claim 7, wherein when the movable core displaces toward the fixed core and the stopper abuts the adjacent member, a gap is formed between the movable core and the fixed core.

10. An ejector for a fuel cell system comprising:

an ejector body including an inlet port supplied with fuel gas from a fuel gas supply means, an outlet port communicated with a fuel gas supply passage communicated with a fuel cell, and a suction port communicated with a circulation passage and for suctioning fuel off-gas discharged and returned from the fuel cell;

a nozzle having a nozzle hole for discharging fuel gas supplied via the inlet port;

a diffuser for mixing the fuel gas discharged from the nozzle hole and a fuel off-gas discharged and returned via the circulation passage from the fuel cell;

a nozzle-hole section area regulating mechanism including a needle axially extending in a hollow portion of the nozzle and for regulating a discharge section area of the nozzle hole; and a solenoid including a movable core that displaces along with the needle toward a fixed core due to a coil excitation, wherein a dent portion is provided at one end portion of the movable core opposing the fixed core in the axial direction, the dent portion extending apart from the fixed core, and a projection portion is provided at one end portion of the fixed core opposing the dent portion of the movable core in the axial direction, the projection portion having a shape corresponding to the shape of the dent portion.

11. The ejector for a fuel cell system as set forth in the claim 10, wherein the ejector body includes a housing of a cylinder hollow body with a bottom, in which the solenoid is housed, and by fixing the housing tightly to the other members of the ejector body, a coil winding body with a coil wound is held at each end portion thereof in the axial direction, and a clearance in the radial direction is formed between in an inner diameter face of the housing and an outer diameter face of the coil winding body.

12. The ejector for a fuel cell system as set forth in the claim 11, wherein a flux relay portion is provided on the inner wall of the housing so as to relay flux to the fixed core in the radial direction.

* * * * *